US012621042B2

(12) United States Patent
Dai et al.

(10) Patent No.: US 12,621,042 B2
(45) Date of Patent: *May 5, 2026

(54) BACK-COMPATIBLE RECONFIGURABLE INTELLIGENT SURFACE DISCOVERY VIA SIGNATURED WIRELESS SENSING

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 17/448,018

(22) Filed: Sep. 17, 2021

(65) Prior Publication Data

US 2023/0087862 A1      Mar. 23, 2023

(51) Int. Cl.
H04B 7/155        (2006.01)
H04B 7/06        (2006.01)
(52) U.S. Cl.
CPC ......... H04B 7/155 (2013.01); H04B 7/06952 (2023.05)
(58) Field of Classification Search
CPC .. H04B 7/04013; H04B 7/0619; H04B 7/026; H04B 7/155; H04B 7/15528; H04B 7/06952; H04B 7/0413; H04B 7/0617; H04L 25/0226; H04W 84/047
See application file for complete search history.

(56) References Cited

U.S. PATENT DOCUMENTS

| | | | |
|---|---|---|---|
| 11,316,577 B2 | 4/2022 | John Wilson et al. |
| 11,528,657 B1 | 12/2022 | Mangalvedhe et al. |
| 11,546,194 B1 | 1/2023 | Dai |
| 11,695,466 B2 | 7/2023 | Nam et al. |
| 11,750,454 B2 | 9/2023 | Dai et al. |
| 11,863,286 B2 | 1/2024 | Nam et al. |

(Continued)

FOREIGN PATENT DOCUMENTS

| | | |
|---|---|---|
| CN | 111093267 A | 5/2020 |
| CN | 111245494 A | 6/2020 |

(Continued)

OTHER PUBLICATIONS

Partial International Search Report—PCT/US2022/075237—ISA/EPO—Nov. 3, 2022.

(Continued)

*Primary Examiner* — Khalid W Shaheed
(74) *Attorney, Agent, or Firm* — Harrity & Harrity, LLP/QUALCOMM Incorporated

(57) ABSTRACT

Various aspects of the present disclosure generally relate to wireless communication. In some aspects, a first wireless node may transmit, to a reconfigurable intelligent surface (RIS), a first signal modulated using a first modulation signature, wherein the first modulation signature is an inverted modulation signature associated with a second modulation signature to be applied by the RIS. The first wireless node may receive, from a second wireless node, a second signal indicating that the first signal has been redirected by the RIS and received by the second wireless node. Numerous other aspects are described.

55 Claims, 16 Drawing Sheets

(56) References Cited

U.S. PATENT DOCUMENTS

| | | | |
|---|---|---|---|
| 11,924,739 | B2 | 3/2024 | Nam et al. |
| 12,177,144 | B2 | 12/2024 | Nam et al. |
| 2010/0303134 | A1 | 12/2010 | Kawasaki |
| 2014/0162655 | A1 | 6/2014 | Hong et al. |
| 2019/0305830 | A1 | 10/2019 | Zhou et al. |
| 2020/0015214 | A1 | 1/2020 | Si et al. |
| 2020/0146070 | A1 | 5/2020 | Xiong et al. |
| 2020/0322949 | A1 | 10/2020 | Akkarakaran et al. |
| 2021/0013619 | A1 | 1/2021 | Alkhateeb et al. |
| 2021/0176670 | A1 | 6/2021 | Keskitalo et al. |
| 2021/0297135 | A1 | 9/2021 | Kim et al. |
| 2022/0003830 | A1 | 1/2022 | Cha et al. |
| 2022/0014935 | A1 | 1/2022 | Haija et al. |
| 2022/0052764 | A1* | 2/2022 | Medra .................. H04B 10/614 |
| 2022/0174509 | A1 | 6/2022 | Noh et al. |
| 2022/0232396 | A1 | 7/2022 | Cavcic et al. |
| 2022/0278738 | A1* | 9/2022 | Dai ...................... H04B 7/0695 |
| 2022/0407222 | A1 | 12/2022 | Zhu et al. |
| 2023/0176174 | A1 | 6/2023 | Penna et al. |
| 2023/0208479 | A1* | 6/2023 | Wang ................... H04B 7/0617 |
| | | | 375/262 |
| 2023/0258759 | A1 | 8/2023 | Wang et al. |
| 2023/0291461 | A1 | 9/2023 | Nam et al. |
| 2025/0015877 | A1 | 1/2025 | Nam |
| 2025/0070940 | A1 | 2/2025 | Nam et al. |

FOREIGN PATENT DOCUMENTS

| | | | | |
|---|---|---|---|---|
| CN | 111418255 | A | 7/2020 | |
| CN | 112272418 | A * | 1/2021 | ............ H04W 76/14 |
| CN | 114448586 | A | 5/2022 | |
| WO | 2019217717 | A1 | 11/2019 | |
| WO | 2020029200 | A1 | 2/2020 | |
| WO | 2021067784 | A1 | 4/2021 | |
| WO | 2021179965 | A1 | 9/2021 | |
| WO | 2021236510 | A1 | 11/2021 | |
| WO | 2022186815 | A1 | 9/2022 | |

OTHER PUBLICATIONS

International Search Report and Written Opinion—PCT/US2022/075237—ISA/EPO—Jan. 17, 2023.

Luo J., et al., "Reconfigurable Intelligent Surface: Reflection Design Against Passive Eavesdropping", IEEE Transactions on Wireless Communications, IEEE Service Center, Piscataway, NJ, US, vol. 20, No. 5, May 2021, pp. 3350-3364, XP011853515, ISSN: 1536-1276, DOI: 10.1109/TWC.2021.3049312, Abstract, Sections I-III, p. 3350-3359, Figures 1-4.

Wu Q., et al., "Intelligent Reflecting Surface Enhanced Wireless Network: Joint Active and Passive Beamforming Design", 2018 IEEE Global Communications Conference (GLOBECOM), IEEE, Dec. 9, 2018 (Dec. 9, 2018), pp. 1-6, XP033519782, DOI: 10.1109/GLOCOM.2018.8647620 [retrieved on Feb. 20, 2019] abstract, paragraph [0001], figure 1.

Jung M., et al., "Asymptotic Optimality of Reconfigurable Intelligent Surfaces: Passive Beamforming and Achievable Rate", ICC 2020—2020 IEEE International Conference on Communications (ICC), IEEE, Jun. 7, 2020, 6 Pages, XP033797656, DOI: 10.1109/ICC40277.2020.9148640, Section II, Figure 1, Subsection III B.

Jung M., et al., "On the Optimality of Reconfigurable Intelligent Surfaces (RISs): Passive Beamforming, Modulation, and Resource Allocation", arxiv.org, Cornell University Library, 201 Olin Library Cornell University Ithaca, NY 14853, Oct. 2, 2019, pp. 1-33, XP081502033, Feb. 4, 2021, Figure 3, Subsection II B.

Jung M., et al., "On the Optimality of Reconfigurable Intelligent Surfaces (RISs): Passive Beamforming, Modulation, and Resource Allocation", IEEE Transactions on Wireless Communications, IEEE Service Center, Piscataway, NJ, US, vol. 20, No. 7, Feb. 18, 2021, pp. 4347-4363, XP011865418, 16 Pages, ISSN: 1536-1276, DOI: 10.1109/TWC.2021.3058366, Subsection IB, Subsection III B, Figure 1.

* cited by examiner

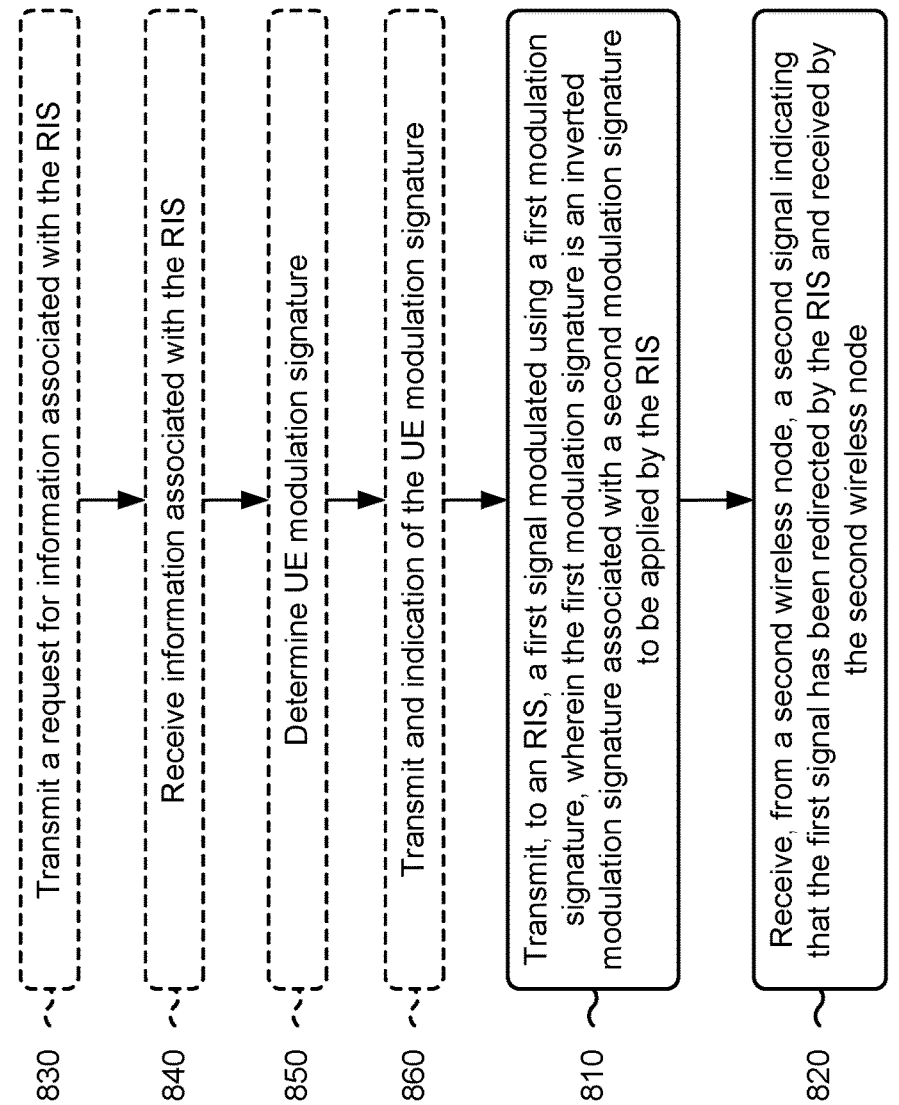

830 — Transmit a request for information associated with the RIS

840 — Receive information associated with the RIS

850 — Determine UE modulation signature

860 — Transmit and indication of the UE modulation signature

810 — Transmit, to an RIS, a first signal modulated using a first modulation signature, wherein the first modulation signature is an inverted modulation signature associated with a second modulation signature to be applied by the RIS 820 — Receive, from a second wireless node, a second signal indicating that the first signal has been redirected by the RIS and received by the second wireless node

910  Receive a first signal

920  Decoding the first signal, wherein the first signal being decodable indicates that the first signal has been redirected by a RIS 930  Transmit, to a first wireless node, a second signal indicating that the first signal has been reflected by the RIS and received by the second wireless node

900

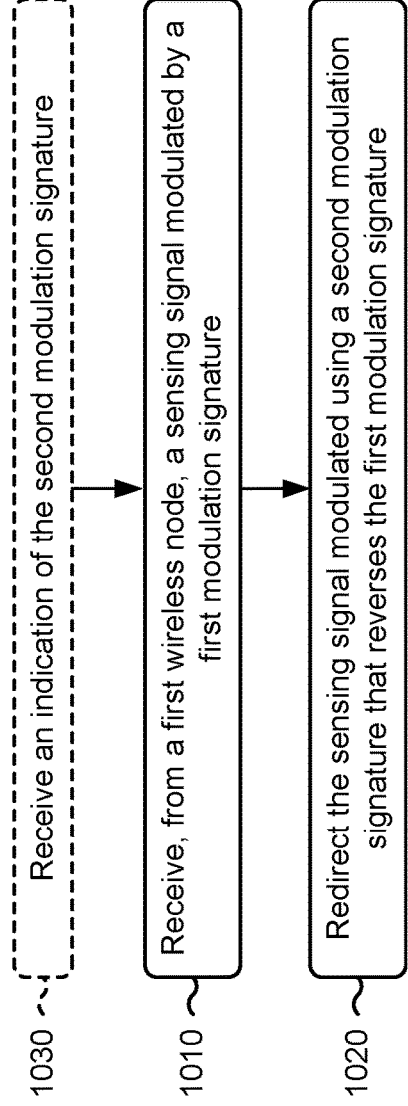
1030 — Receive an indication of the second modulation signature
1010 — Receive, from a first wireless node, a sensing signal modulated by a first modulation signature
1020 — Redirect the sensing signal modulated using a second modulation signature that reverses the first modulation signature
1000
FIG. 10

BACK-COMPATIBLE RECONFIGURABLE INTELLIGENT SURFACE DISCOVERY VIA SIGNATURED WIRELESS SENSING

INTRODUCTION

Aspects of the present disclosure generally relate to wireless communication and to techniques and apparatuses for reconfigurable intelligent surface (RIS) discovery using wireless sensing.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some implementations described herein relate to a first wireless node for wireless communication. The first wireless node may include a memory and one or more processors coupled to the memory. The first wireless node may be configured to transmit, to a reconfigurable intelligent surface (RIS), a first signal modulated using a first modulation signature, wherein the first modulation signature is an inverted modulation signature associated with a second modulation signature to be applied by the RIS. The first wireless node may be configured to receive, from a second wireless node, a second signal indicating that the first signal has been redirected by the RIS and received by the second wireless node.

Some implementations described herein relate to a second wireless node for wireless communication. The second wireless node may include a memory and one or more processors coupled to the memory. The second wireless node may be configured to receive a first signal. The second wireless node may be configured to decode the first signal, wherein the first signal being decodable indicates that the first signal has been redirected by a RIS. The second wireless node may be configured to transmit, to a first wireless node and based at least in part on decoding the first signal, a second signal indicating that the first signal has been reflected by the RIS and received by the second wireless node.

Some implementations described herein relate to a RIS for wireless communication. The reconfigurable intelligent surface may include a memory and one or more processors coupled to the memory. The RIS may be configured to receive, from a first wireless node, a sensing signal modulated by a first modulation signature. The RIS may be configured to redirect the sensing signal modulated using a second modulation signature that reverses the first modulation signature.

Some implementations described herein relate to a method of wireless communication performed by a first wireless node. The method may include transmitting, to a RIS, a first signal modulated using a first modulation signature, wherein the first modulation signature is an inverted modulation signature associated with a second modulation signature to be applied by the RIS. The method may include receiving, from a second wireless node, a second signal indicating that the first signal has been redirected by the RIS and received by the second wireless node.

Some implementations described herein relate to a method of wireless communication performed by a second wireless node. The method may include receiving a first signal. The method may include decoding the first signal, wherein the first signal being decodable indicates that the first signal has been redirected by a RIS. The method may include transmitting, to a first wireless node and based at least in part on decoding the first signal, a second signal indicating that the first signal has been reflected by the RIS and received by the second wireless node.

Some implementations described herein relate to a method of wireless communication performed by a RIS. The method may include receiving, from a first wireless node, a sensing signal modulated by a first modulation signature. The method may include redirecting the sensing signal modulated using a second modulation signature that reverses the first modulation signature.

Some implementations described herein relate to a non-transitory computer-readable medium that stores a set of instructions for wireless communication for a first wireless node. The set of instructions, when executed by one or more processors of the first wireless node, may cause the first wireless node to transmit, to a RIS, a first signal modulated using a first modulation signature, wherein the first modulation signature is an inverted modulation signature associated with a second modulation signature to be applied by the RIS. The set of instructions, when executed by one or more processors of the first wireless node, may cause the first wireless node to receive, from a second wireless node, a second signal indicating that the first signal has been redirected by the RIS and received by the second wireless node.

Some implementations described herein relate to a non-transitory computer-readable medium that stores a set of instructions for wireless communication for a second wireless node. The set of instructions, when executed by one or more processors of the second wireless node, may cause the second wireless node to receive a first signal. The set of instructions, when executed by one or more processors of the second wireless node, may cause the second wireless node to decode the first signal, wherein the first signal being decodable indicates that the first signal has been redirected by a RIS. The set of instructions, when executed by one or more processors of the second wireless node, may cause the second wireless node to transmit, to the second wireless node and based at least in part on decoding the first signal, a second signal indicating that the first signal has been reflected by the RIS and received by the second wireless node.

Some implementations described herein relate to a non-transitory computer-readable medium that stores a set of instructions for wireless communication for a RIS. The set of instructions, when executed by one or more processors of the RIS, may cause the RIS to receive, from a first wireless node, a sensing signal modulated by a first modulation signature. The set of instructions, when executed by one or more processors of the RIS, may cause the RIS to redirect the sensing signal modulated using a second modulation signature that reverses the first modulation signature.

Some implementations described herein relate to an apparatus for wireless communication. The apparatus may include means for transmitting, to a RIS, a first signal modulated using a first modulation signature, wherein the first modulation signature is an inverted modulation signature associated with a second modulation signature to be applied by the RIS. The apparatus may include means for receiving, from a second wireless node, a second signal indicating that the first signal has been redirected by the RIS and received by the second wireless node.

Some implementations described herein relate to an apparatus for wireless communication. The apparatus may include means for receiving a first signal. The apparatus may include means for decoding the first signal, wherein the first signal being decodable indicates that the first signal has been redirected by a RIS. The apparatus may include means for transmitting, to a first wireless node and based at least in part on decoding the first signal, a second signal indicating that the first signal has been reflected by the RIS and received by the second wireless node.

Some implementations described herein relate to an apparatus for wireless communication. The apparatus may include means for receiving, from a first wireless node, a sensing signal modulated by a first modulation signature. The apparatus may include means for redirecting the sensing signal modulated using a second modulation signature that reverses the first modulation signature.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed by a wireless node associated with RIS discovery using wireless sensing, in accordance with the present disclosure.

FIG. 10 is a diagram illustrating an example process performed by a RIS associated with RIS discovery using wireless sensing, in accordance with the present disclosure.

DETAILED DESCRIPTION

Figure 1:
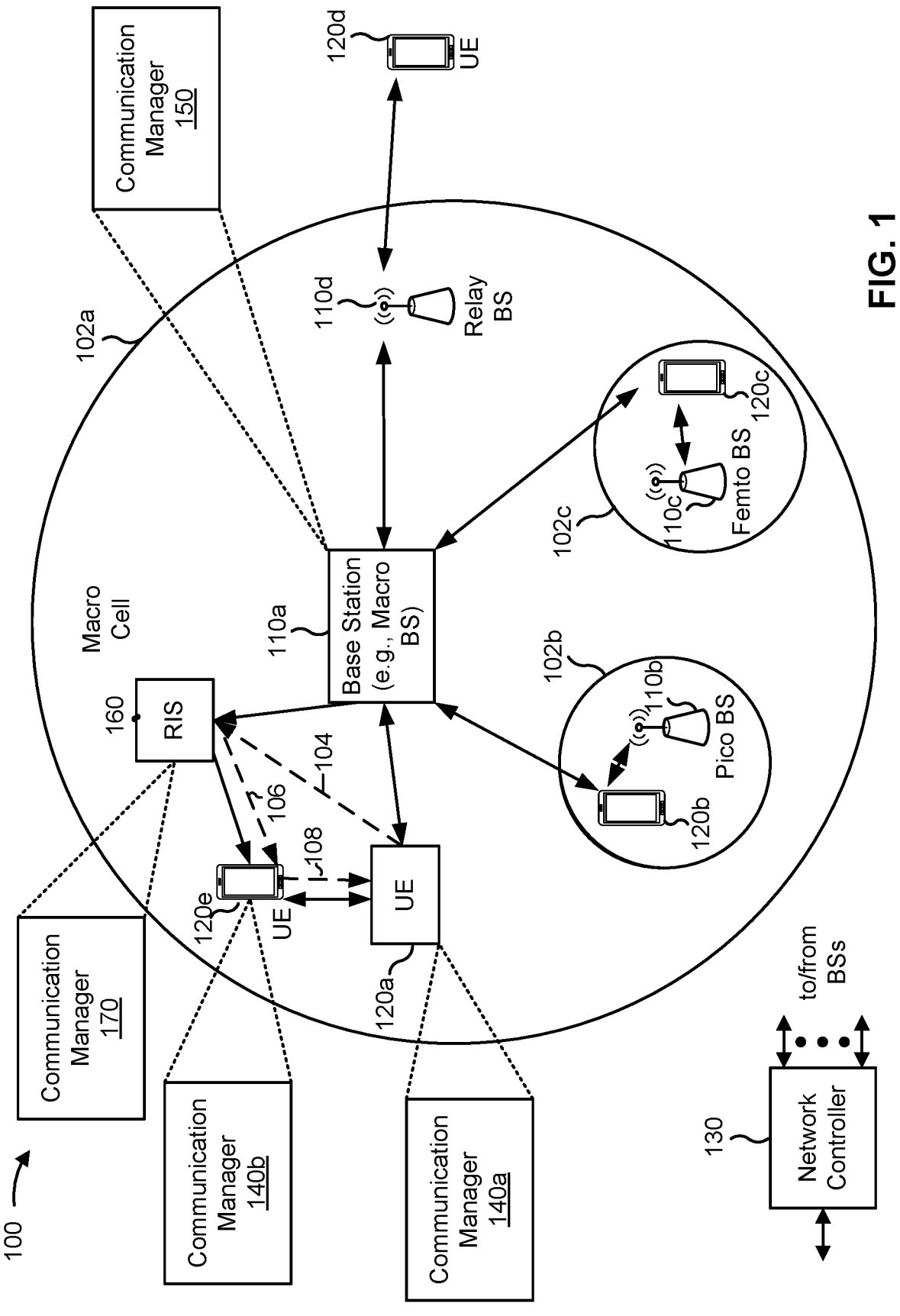
FIG. 1 is a diagram illustrating an example of a wireless network, in accordance with the present disclosure.

A reconfigurable intelligent surface (RIS) may be deployed in a wireless network to improve communication performance and efficiency. A RIS may include a planar or two-dimensional structure or surface that is designed to have properties to enable a dynamic control of signals or electromagnetic waves reflected and/or redirected by the RIS. The RIS may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization.

In a wireless communication system, a RIS may enable a transmitter (e.g., a base station or a user equipment (UE)) to control the scattering, reflection, and refraction characteristics of signals transmitted by the transmitter, to overcome the negative effects of wireless propagation. For example, the RIS may effectively control signal characteristics (e.g., spatial direction, beam width, phase, amplitude, frequency, and/or polarization) of an impinging signal (e.g., a signal transmitted by the transmitter that impinges on the RIS) without a need for complex decoding, encoding, and radio frequency processing operations. Therefore, the RIS may provide increased channel diversity for propagation of signals in a wireless network. The increased channel diversity provides robustness to channel fading and/or blocking, such as when higher frequencies are used by wireless nodes in the wireless communication network (e.g., millimeter wave frequencies and/or sub-terahertz frequencies). Moreover, as the RIS does not need to perform complex decoding, encoding, and radio frequency processing operations, the RIS may provide a more cost and energy efficient manner of reflecting and/or redirecting signals in a wireless network (e.g., as compared to other mechanisms for reflecting and/or redirecting signals, such as a relay device).

When a RIS is deployed in a wireless network, a base station may control the RIS for downlink and uplink communications. The presence of the RIS may be known to a UE and/or to other wireless nodes, such as a base station or customer premises equipment (CPE) in a neighboring cell associated with the base station that controls the RIS or a cell that is fully or partially overlaid on the cell associated with the base station that controls the RIS. However, the UE (or another wireless node) may not have sufficient information regarding the RIS that enables the UE to use the RIS (e.g., for sidelink communications with another UE). Furthermore, in some examples (e.g., due to UE mobility), the UE may not track the time-varying relative position of the RIS with respect to the UE. In some cases, a UE (or another wireless node) may use bi-static sensing to discover a location of the RIS deployed in a wireless network and to acquire information about the RIS. "Bi-static sensing" is a technique that uses a transmitter and a receiver at separate locations to discover a location of a RIS.

Bi-static sensing involves two wireless nodes. In some aspects, the two wireless nodes may be two UEs, such as a transmit (Tx) UE and a receive (Rx) UE. In some aspects, at least one of the wireless nodes may be a base station. In one or more examples, in which the two wireless nodes are UEs, the Tx UE may also be referred to a sensing UE, and the Rx UE may also be referred to as an assistant UE. In order to discover a RIS using bi-static sensing, the Tx UE may transmit a sensing signal to the RIS. As used herein, "sensing signal" may refer to any signal that is used for bi-static sensing to discover a location of a RIS. In some examples, the sensing signal may be a signal configured (e.g., by a base station) for bi-static sensing. In other examples, the sensing signal may be a reference signal. In some aspects, the Tx UE may sweep the sensing signal over different beam directions to attempt to determine a beam direction that results in the sensing signal being reflected by the RIS. The RIS, in connection with receiving the sensing signal transmitted by the Tx UE, may reflect the sensing signal as a reflected signal. The Rx UE may monitor for a reflected signal from the RIS. Upon receiving the reflected signal (e.g., the reflected sensing signal) from the RIS, the Rx UE may communicate with the Tx UE over a sidelink regarding the location of the RIS. In some examples, the timing of the sidelink communication from the Rx UE to the Tx UE may indicate, to the Tx UE the relative location of the RIS to the Tx UE (e.g., a beam direction from the Tx UE toward the RIS).

In some examples, when the Tx UE sweeps the sensing signal over different beam directions, in addition to the Rx UE receiving the sensing signal that is reflected by the RIS, the sensing signal may reach the Rx UE via reflection from other objects or another RIS, or via direct line-of-sight (LoS) transmission from the Tx UE. However, the Rx UE may have difficulty distinguishing between the reflected sensing signal from the RIS and background reflection from other objects or another RIS (or a direct transmission of the sensing signal from the Tx UE). Distinguishing between the sensing signal reflected by the RIS and other transmissions of the sensing signal that reach the Rx UE may prevent the Rx UE from transmitting the sidelink communication to the Tx UE in connection with a sensing signal that is not reflected by the RIS, and may thereby improve accuracy of the RIS discovery. In some examples, in order to identify a sensing signal reflected by the RIS, the RIS may apply a RIS modulation signature to the sensing signal reflected by the RIS. "Modulation signature" refers to a pattern or sequence of modulation added to a signal. "RIS modulation signature" refers to a pattern or sequence of modulation added by a RIS to a signal redirected or reflected by the RIS. In one or more examples, the RIS modulation signature may be a RIS-specific pattern or sequence of modulation (e.g., associated with a particular RIS) added to a signal redirected or reflected by the RIS. The Rx UE may distinguish the reflected sensing signal from other signals received by Rx UE by detecting the RIS modulation signature in the reflected sensing signal. For example, the Rx UE may receive information identifying the RIS modulation signature associated with the RIS. When the Rx UE receives the sensing signal, the Rx UE may detect a modulation signature in the sensing signal and compare the detected modulation signature with the RIS modulation signature associated with the RIS to determine whether the sensing signal was redirected by the RIS. However, some UEs may lack the capability to detect a RIS modulation signature in a received signal.

Some techniques and apparatuses described herein enable a first wireless node to transmit, to a RIS, a sensing signal modulated using a first modulation signature. In one example, the first wireless node is a Tx UE. According to one or more examples, the RIS may receive the sensing signal modulated using the first modulation signature and redirect the sensing signal using a second modulation signature. In one or more examples, the second modulation signature may reverse the first modulation signature. "Reversing" a modulation signature refers to recovering a demodulated signal from a signal modulated using the modulation signature (e.g., recovering an original signal to which the modulation signature was applied). A second wireless node may receive the sensing signal redirected by the RIS and transmit a return signal to the first wireless node. In one example, the second wireless node is an Rx UE. The return signal is a signal that provides an indication, to the first wireless node, of a relative direction of the RIS with respect to the first wireless node. In one or more examples, the second wireless node may transmit the return signal directly to the first wireless node (e.g., via a sidelink). The second wireless node may transmit the return signal based at least in part on decoding the sensing signal redirected by the RIS. The sensing signal redirected by the RIS may be decodable by the second wireless node based at least in part on the RIS redirecting the sensing signal using the second modulation signature that reverses the first modulation signature applied to the sensing signal by the first wireless node. In one or more examples, the sensing signal, when modulated using the first modulation signature by the first wireless node, may be undecodable until the sensing signal is redirected by the RIS and modulated using the second modulation signature that reverses the first modulation signature. As a result, according to one or more examples, the sensing signal being decodable by the second wireless node indicates that the sensing signal has been redirected by the RIS. In this manner, according to one or more examples, the second wireless node may decode a sensing signal redirected by the RIS, and the second wireless node may not decode a sensing signal received via background reflection (or direct transmission from the first wireless node). Thus, according to one or more examples, the second wireless node may transmit the return signal to the first wireless node in connection with receiving (and decoding) the sensing signal redirected by the RIS, without sending a return signal to the first wireless node in connection with a sensing signal that reaches the second wireless node without being redirected by the RIS. Furthermore, because the second modulation signature applied by the RIS reverses the first modulation signature applied by the first wireless node, the second wireless node does not need to detect a RIS modulation signature in the sensing signal reflected by the RIS to distinguish between the sensing signal reflected by the RIS and sensing signal not reflected by the RIS, which enables UEs that lack the capability to detect the RIS modulation signature to be used (e.g., as Rx UEs or assistant UEs) to support bi-static wireless sensing for RIS discovery. That is, techniques and apparatuses described herein may enable back-compatible RIS discovery via signature wireless sensing for a UE that lacks the capability to detect a RIS modulation signature in a received signal.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As shown in FIG. 1, the wireless network 100 may include a RIS 160. The RIS 160 may include one or more reconfigurable elements capable of redirecting or reflecting signals transmitted by a base station 110 or a UE 120. In some aspects, a first wireless node (e.g., UE 120a) may transmit a sensing signal 104 to the RIS 160. In some aspects, the sensing signal 104 transmitted by the first wireless node (e.g., UE 120a) may be modulated using a first modulation signature. In some aspects, the RIS 160 may redirect the sensing signal 104 and may modulate the sensing signal 104 using a second modulation signature that reverses the first modulation signature, resulting in a redirected sensing signal 106. In some aspects, a second wireless node (e.g., UE 120e) may receive the redirected sensing signal 106, and the second wireless node (e.g., UE 120e) may transmit a return signal 108 to the first wireless node (e.g., 120a). In some aspects, the return signal 108 may indicate, to the first wireless node (e.g., UE 120a) a relative position of the RIS 160 with respect to the first wireless node (e.g., UE 120a).

In some aspects, the UE 120 may include a communication manager 140. As described in more detail elsewhere herein, a communication manager 140a of a first UE 120a may transmit, to a RIS (e.g., RIS 160), a first signal (e.g., sensing signal 104) modulated using a first modulation signature, wherein the first modulation signature is an inverted modulation signature associated with a second modulation signature to be applied by the RIS; and receive, from a wireless node (e.g., UE 120e), a second signal (e.g., return signal 108) indicating that the first signal has been redirected by the RIS and received by the wireless node. Additionally, or alternatively, the communication manager 140 may perform one or more other operations described herein.

In some aspects, as described in more detail elsewhere herein, a communication manager 140b of a second UE 120e may receive a first signal (e.g., redirected sensing signal 106); decode the first signal, wherein the first signal being decodable indicates that the first signal has been redirected by a RIS (e.g., RIS 160); and transmit, to a wireless node (e.g., UE 120a) and based at least in part on decoding the first signal, a second signal (e.g., return signal 108) indicating that the first signal has been reflected by the RIS and received by the second UE 120e. Additionally, or alternatively, the communication manager 140 may perform one or more other operations described herein.

In some aspects, the base station 110 may include a communication manager 150. As described in more detail elsewhere herein, the communication manager 150 may transmit, to a RIS, a first signal modulated using a first modulation signature, wherein the first modulation signature is an inverted modulation signature associated with a second modulation signature to be applied by the RIS; and receive, from a wireless node (e.g., a UE 120 or a base station 110), a second signal indicating that the first signal has been redirected by the RIS and received by the second wireless node. Additionally, or alternatively, the communication manager 150 may perform one or more other operations described herein.

In some aspects, as described in more detail elsewhere herein, the communication manager 150 may receive a first signal; decode the first signal, wherein the first signal being decodable indicates that the first signal has been redirected by a RIS (e.g., RIS 160) and transmit, to a wireless node (e.g., a UE 120 or a base station 110) and based at least in part on decoding the first signal, a second signal indicating that the first signal has been reflected by the RIS and received by the base station 110. Additionally, or alternatively, the communication manager 140 may perform one or more other operations described herein.

In some aspects, the RIS 160 may include a communication manager 170. As described in more detail elsewhere herein, the communication manager 170 may receive, from a wireless node (e.g., UE 120a or a base station 110), a sensing signal (e.g., sensing signal 104) modulated by a first modulation signature; and redirect the sensing signal modulated using a second modulation signature that reverses the first modulation signature. Additionally, or alternatively, the communication manager 170 may perform one or more other operations described herein.

As indicated above, FIG. 1 is provided as an example. Other examples may differ from what is described with regard to FIG. 1.

Figure 2:
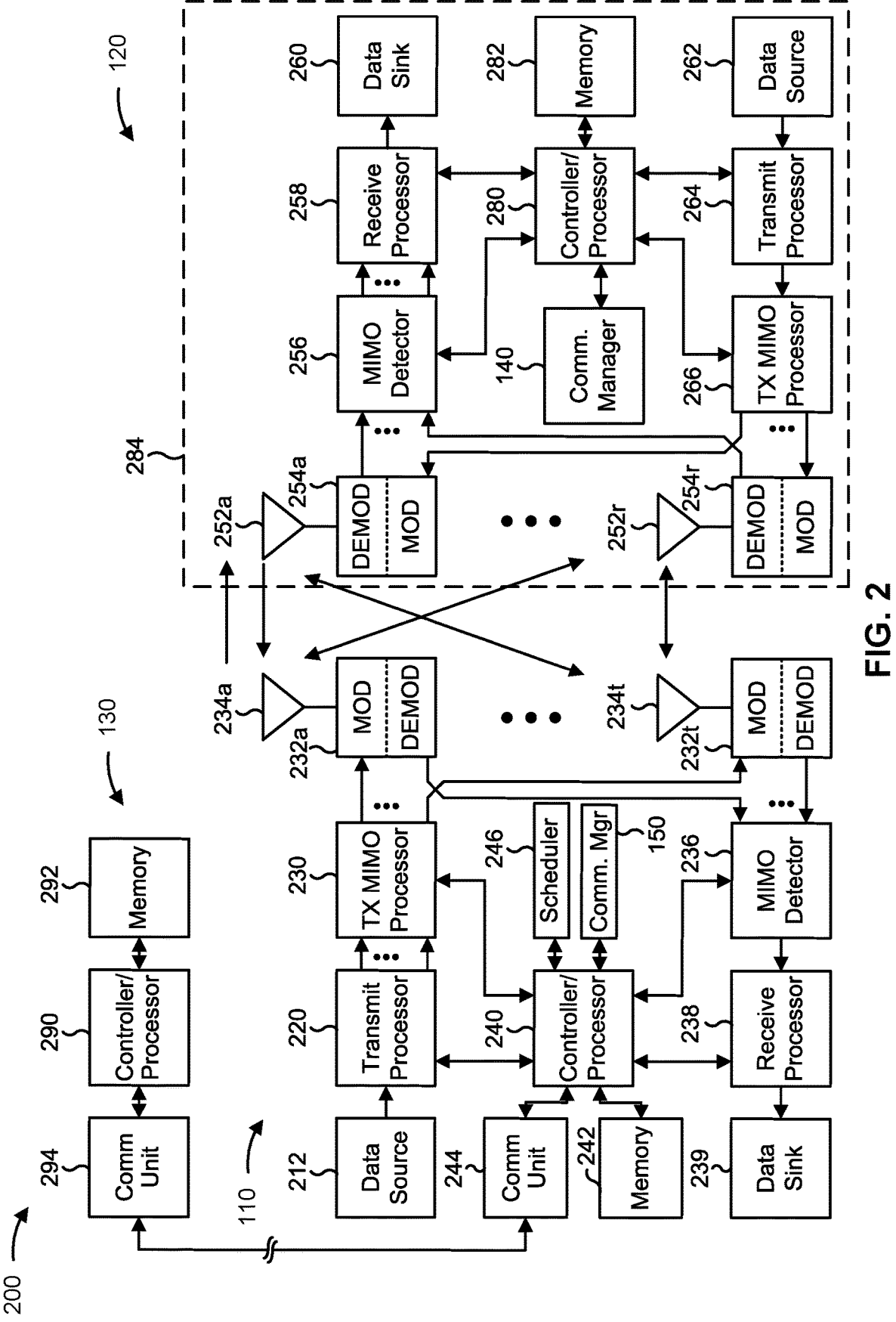
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with RIS discovery using wireless sensing, as described in more detail elsewhere herein. In some aspects, the wireless node described herein is the UE 120, is included in the UE 120, or includes one or more components of the UE 120 shown in FIG. 2. In some aspects, the wireless node described herein is the base station 110, is included in the base station 110, or includes one or more component of the base station 110 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG.

9, process 1000 of FIG. 10, and/or other processes as described herein. In some examples, executing instructions may include running the instructions, converting the instructions, compiling the instructions, and/or interpreting the instructions, among other examples.

In some aspects, a first wireless node includes means for transmitting, to a RIS, a first signal modulated using a first modulation signature, wherein the first modulation signature is an inverted modulation signature associated with a second modulation signature to be applied by the RIS; and/or means for receiving, from a second wireless node, a second signal indicating that the first signal has been redirected by the RIS and received by the second wireless node. In some aspects, the means for the first wireless node to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the first wireless node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a second wireless node includes means for receiving a first signal; means for decoding the first signal, wherein the first signal being decodable indicates that the first signal has been redirected by a RIS; and/or means for transmitting, to a first wireless node and based at least in part on decoding the first signal, a second signal indicating that the first signal has been reflected by the RIS and received by the second wireless node. In some aspects, the means for the first wireless node to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the first wireless node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a RIS includes means for receiving, from a first wireless node, a sensing signal modulated by a first modulation signature; and/or means for redirecting the sensing signal modulated using a second modulation signature that reverses the first modulation signature. In some aspects, the means for the RIS to perform operations described herein may include, for example, one or more of communication manager 170, a transmit processor, an antenna, a modem, a receive processor, a controller/processor, a memory, and/or one or more reconfigurable elements.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
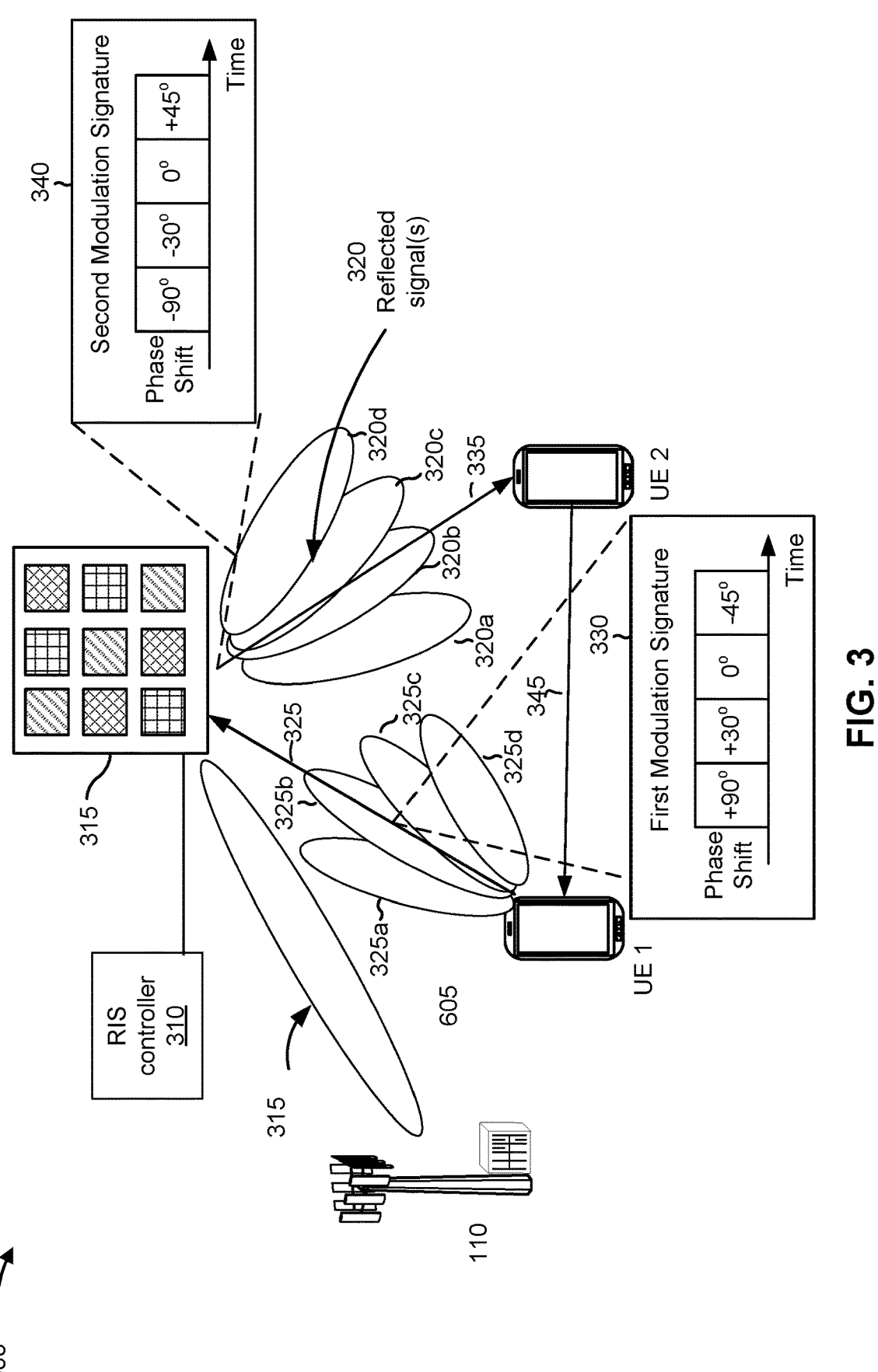
FIG. 3 is a diagram illustrating an example of communications using a reconfigurable intelligent surface (RIS), in accordance with the present disclosure.

FIG. 3 is a diagram illustrating an example 300 of communications using a RIS, in accordance with the present disclosure. As shown in FIG. 3, a base station 110 may communicate with a first UE 120 (e.g., UE 1) and a second UE 120 (e.g., UE 2) in a wireless network, such as the wireless network 100. The base station 110 and the UEs 120 (e.g., UE 1 and/or UE 2) may use a RIS 305 to communicate with one another. For example, the RIS 305 may reflect or redirect a signal to the base station 110 and/or the UEs 120. The RIS 305 may also be referred to as an intelligent reflecting surface. In some examples, the RIS 305 may be a repeater.

The RIS 305 may be, or may include, a planar or two-dimensional structure or surface that is designed to have properties to enable a dynamic control of signals or electromagnetic waves reflected and/or redirected by the RIS 305. The RIS 305 may include one or more reconfigurable elements. For example, the RIS 305 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 305 may be capable of modifying one or more properties (e.g., direction, beam width, phase, amplitude, and/or polarization) of an impinging signal.

The reconfigurable elements of the RIS 305 may be controlled and/or configured by a RIS controller 310. The RIS controller 310 may be a control module (e.g., a controller and/or a processor) that is capable of configuring the electromagnetic characteristic(s) of each reconfigurable element of the RIS 305. The RIS controller 310 may be, or may be included in, the communication manager 170. Alternatively, the communication manager 170 may be included in the RIS controller 310. The RIS controller 310 may receive control communications (e.g., from a base station 110 and/or a UE 120) indicating one or more properties of reflected signals (e.g., indicating a desired direction, a desired beam width, a desired phase, a desired amplitude, and/or a desired polarization). Therefore, in some examples, the RIS 305 may be capable of receiving communications (e.g., via the RIS 305 and/or the RIS controller 310). In some examples, the RIS 305 and/or the RIS controller 310 may not have transmit capabilities (e.g., the RIS 305 may be capable of reflecting and/or redirecting impinging signals, via the reconfigurable elements, and modifying the reflected signals, but may not be capable of generating and/or transmitting signals). Due to the capability of the RIS 305 to receive communications (e.g., via the RIS 305 and/or the RIS controller 310), the RIS 305 may recover partial synchronization with other wireless communication nodes (e.g., a base station 110 and/or a UE 120). For example, the RIS 305 may acquire and track a frame structure (e.g., downlink or uplink frame structure) and/or slot or symbol boundaries, among other examples.

As shown in FIG. 3, the base station 110 may transmit a signal 315. The signal 315 may be transmitted in a spatial direction toward the RIS 305. The RIS controller 310 may configure the reconfigurable elements of the RIS 305 to reflect and/or redirect the signal 315 in a desired spatial direction and/or with one or more desired signal character-istics (e.g., beam width, phase, amplitude, frequency, and/or polarization). For example, as shown by reference number 320, the RIS 305 may be capable of reflecting the signal 315 in one or more spatial directions (e.g., on one or more reflection beams 320a-320d). Although multiple reflection beams 320a-320d are shown in FIG. 3 representing different beam states or beam directions of the RIS 305, the RIS 305 may be capable of reflecting a signal with one beam state or one beam direction at a time. In one example, the RIS 305 may be configured to reflect the signal 315 on a first reflection beam 320a using a first beam state. "Beam" may refer to a directional transmission such as a wireless signal that is transmitted in a direction of a receiving device. "Beam state" may refer to a spatial direction and/or a beam of a reflected signal (e.g., a signal reflected by the RIS 305). "RIS state" may refer to a configuration of the RIS 315 (e.g., a configuration of the reconfigurable elements of the RIS 315) to reflect or redirect a signal in a spatial direction or reflection beam. "Reflection beam" may refer to a beam on which a signal is reflected by the RIS 305. In another example, the RIS 305 may be configured to reflect the signal 315 on a second reflection beam 320b using a second beam state. As shown in FIG. 3, the second beam state may cause the signal 315 to be reflected in a spatial direction (e.g., on the second reflection beam 320b) toward UE 2.

The RIS 305 may be deployed in a wireless network (such as the wireless network 100) to improve communication performance and efficiency. For example, the RIS 305 may enable a transmitter (e.g., a base station 110 or a UE 120) to control the scattering, reflection, and refraction characteris-tics of signals transmitted by the transmitter, to overcome the negative effects of wireless propagation. For example, the RIS 305 may effectively control signal characteristics (e.g., spatial direction, beam width, phase, amplitude, frequency, and/or polarization) of an impinging signal without a need for complex decoding, encoding, and radio frequency pro-cessing operations. Therefore, the RIS 305 may provide increased channel diversity for propagation of signals in a wireless network. The increased channel diversity provides robustness to channel fading and/or blocking, such as when higher frequencies are used by the base station 110 and/or the UE 120 (e.g., millimeter wave frequencies and/or sub-terahertz frequencies). Moreover, as the RIS 305 does not need to perform complex decoding, encoding, and radio frequency processing operations, the RIS 305 may provide a more cost and energy efficient manner of reflecting and/or redirecting signals in a wireless network (e.g., as compared to other mechanisms for reflecting and/or redirecting sig-nals, such as a relay device).

In some aspects, UE 1 and UE 2 may perform bi-static sensing to discover a location of the RIS 305. For example, UE 1 may be a Tx node (e.g., a Tx UE or a sensing UE) and UE 2 may be an Rx node (e.g., an Rx UE or an assistant UE). As shown in FIG. 3, UE 1 may transmit a sensing signal 325 to the RIS 305. "Sensing signal" may refer to any signal that is used for bi-static sensing, such as a signal configured (e.g., by the base station 110) for bi-static sensing or a reference signal. In some aspects, UE 1 may sweep the sensing signal 325 over a plurality of beam directions 325a-325d, and the sensing signal 325 transmitted on at least one beam direction (e.g., 325b) may be received by the RIS 305. In some aspects, the sensing signal 325 transmitted by UE 1 (e.g., in each of the beam directions 325a-325d) may be modulated using a first modulation signature 330. "Modulation signa-ture" may refer to a pattern or sequence of modulation added to a signal. As shown in FIG. 3, in some examples, the first modulation signature 330 may be phase modulation signa-ture (e.g., a pattern or sequence of phase changes or phase shifts applied to the sensing signal 325). For example, the first modulation signature 330 may include a time-domain phase shift pattern that is applied to the sensing signal 325 (e.g., on a per OFDM symbol basis) by UE 1. As shown in FIG. 3, according to one example, the first modulation signature 330 may include a +90° phase shift applied to a first OFDM symbol, a +30° phase shift applied to a second OFDM symbol, a 0° phase shift applied to a third OFDM symbol, and a −45° phase shift applied to a fourth OFDM symbol. In other examples, the first modulation signature may be a frequency modulation signature, a polarization modulation signature, and/or an amplitude modulation sig-nature.

In some aspects, the RIS 305 may receive the sensing signal 325, and the RIS 305 may redirect the sensing signal 325, resulting in a redirected sensing signal 335. In some aspects, the RIS 305 may redirect the sensing signal 325 on a plurality of reflection beams 320a-320d associated with a plurality of beam states. In some aspects, when redirecting the sensing signal 325, the RIS 305 may apply a second modulation signature 340 to the sensing signal 325 that reverses the first modulation signature 330 applied to the sensing signal 325 by UE 1. "Reversing" a modulation signature may refer to recovering a demodulated signal from a signal modulated using the modulation signature (e.g., recovering an original signal to which the modulation sig-nature was applied). In some aspects, the first modulation signature 330 may be an inverted modulation signature associated with the second modulation signature 340 and/or the second modulation signature associated with the first modulation signature 330. An "inverted" modulation signa-ture may refer to a pattern or sequence of modulation that reverses or is reversed by another modulation signature. In some examples, the second modulation signature 340 be a modulation signature that reverses the phase shifts applied in accordance with the first modulation 330. For example, as shown in FIG. 3, the second modulation signature 340 may include a −90° phase shift applied to the first OFDM symbol, a −30° phase shift applied to the second OFDM symbol, a 0° phase shift applied to the third OFDM symbol, and a +45° phase shift applied to the fourth OFDM symbol. Accord-ingly, when the RIS redirects the sensing signal 325 and applies the second modulation signature 340 to the sensing signal 325, the redirected sensing signal 335 may have no phase shift (e.g., 0°) applied to any OFDM symbol.

In some aspects, the RIS 305 may apply the second modulation signature 340 to the sensing signal 325 for all of a set of reflection beams 320a-320d on which the sensing signal 325 is redirected by the RIS 305. In some aspects, the second modulation signature 340 may be a beam-specific modulation signature that is applied to a subset of reflection beams (e.g., 320a and 320b) of the set of reflection beams 320a-320d on which the sensing signal 325 is redirected by the RIS 305.

In some aspects, UE 2 may receive the redirected sensing signal 335. For example, UE 2 may receive the redirected sensing signal 335 on at least one reflection beam (e.g., 320*b*) from the RIS 305. In some aspects, UE 2 may decode the redirected sensing signal 335. In some aspects, the redirected sensing signal 335 being decodable by UE 2 may indicate that the redirected sensing signal 335 was redirected by the RIS 305. For example, the redirected sensing signal 335 may be decodable by UE 2 based at least in part on the RIS redirecting the sensing signal 325 and applying the second modulation signature 340 that reverses the first modulation signature 330, resulting in the redirected sensing signal that no longer is modulated with the first modulation signature 330. According to one or more examples, the sensing signal 325 that is modulated with the first modulation signature 330 may be undecodable by UE 2 until the RIS 305 applies the second modulation signature 340 that reverses the first modulation signature 330.

In some aspects, UE 2, based at least in part on decoding the redirected sensing signal 335, may transmit a return signal 345 to UE 1. For example, UE 2 may transmit the return signal 345 to UE 1 via a sidelink communication. The return signal 345 may indicate that the sensing signal 325 has been redirected by the RIS 305 and received by UE 2 (e.g., as the redirected sensing signal 335). In some aspects, the return signal may indicate a beam direction (e.g., 325*b*) associated with the RIS 305. For example, the timing of the return signal 325 may indicate, to UE 1, that the sensing signal 325 transmitted in beam direction 325*b* was redirected by the RIS 305 and received by UE 2. In some aspects, the return signal may indicate a RIS state, beam state, and/or reflection beam associated with the RIS 305. For example, the timing of the return signal may indicate the beam direction (e.g., 325*b*) for the sensing signal 325 that was redirected by the RIS 305 and a RIS state associated with a reflection beam (e.g., 320*b*) on which the redirected sensing signal 335 was received by UE 2.

As indicated above, FIG. 3 is provided as an example. Other examples may differ from what is described with respect to FIG. 3.

Figure 4:
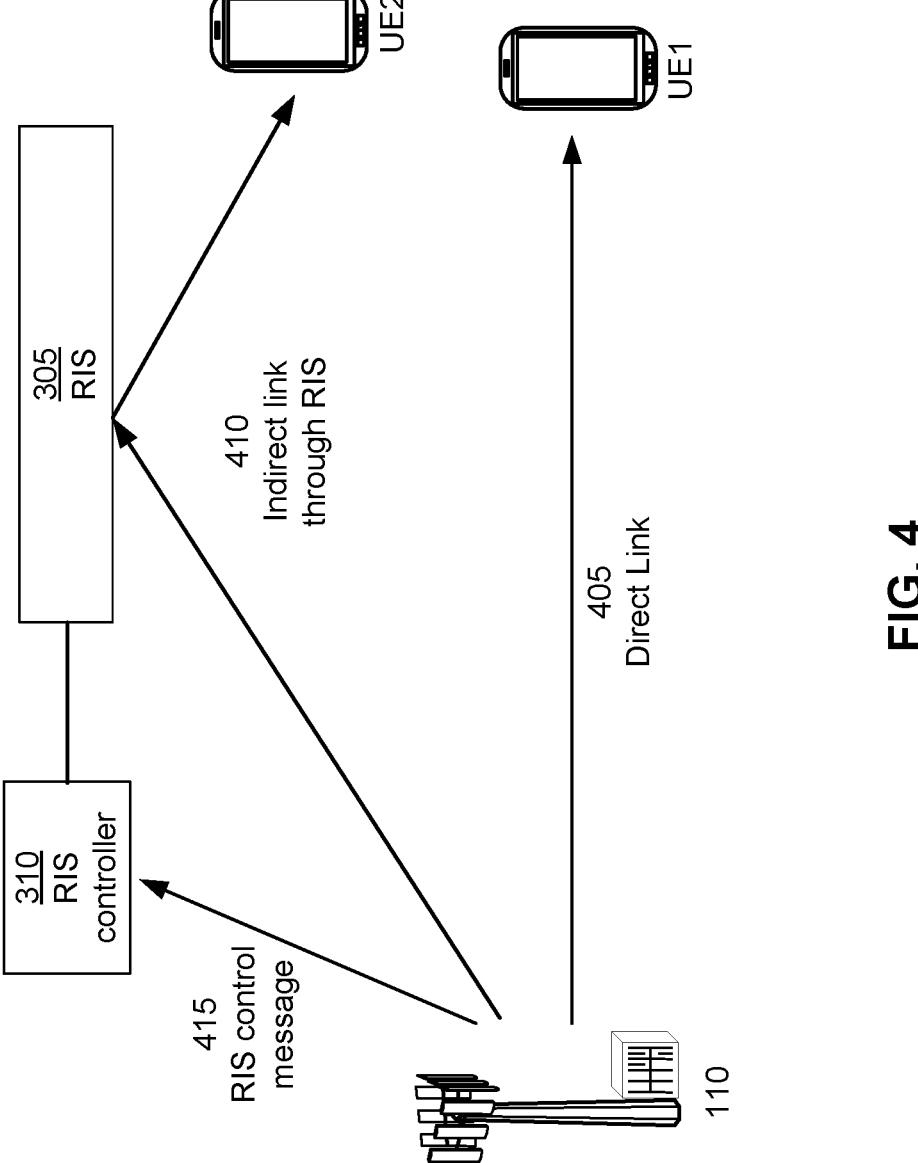
FIG. 4 is a diagram illustrating an example of communication links in a wireless network that includes a RIS, in accordance with the present disclosure.

FIG. 4 is a diagram illustrating an example 400 of communication links in a wireless network that includes a RIS, in accordance with the present disclosure. As shown, example 400 includes a base station 110, a first UE 120 (e.g., UE 1), a second UE 120 (e.g., UE 2), and the RIS 305. The RIS 305 may be controlled and/or configured by the RIS controller 310.

As shown in FIG. 4, some UEs 120, such as UE 1), may receive a communication (e.g., data and/or control information) directly from the base station 110 as a downlink communication. Additionally, or alternatively, some UEs 120, such as UE 2, may receive a communication (e.g., data and/or control information) indirectly from the base station 110 via the RIS 305. For example, the base station 110 may transmit the communication in a spatial direction toward the RIS 305, and the RIS 305 may redirect or reflect the communication to UE 2.

In some examples, UE 1 may communicate directly with the base station 110 via a direct link 405. For example, a communication may be transmitted via the direct link 405. A communication transmitted via the direct link 405 between UE 1 and the base station 110 does not pass through and is not reflected or redirected by the RIS 305. In some examples, UE 2 may communicate indirectly with the base station 110 via an indirect link 410. For example, a communication may be transmitted via different segments of the indirect link 410. In some cases, the base station 110 may establish indirect links 410 through the RIS 305 with one or more UEs 120 out of a coverage area of the base station 110 and/or with one or more UEs for which a direct link 405 is blocked by an obstacle. A communication transmitted via the indirect link 410 between UE 2 and the base station 110 is reflected and/or redirected by the RIS 305. As shown in FIG. 4 and by reference number 415, the base station 110 may communicate with the RIS 305 (e.g., with the RIS controller 310) via a control channel. For example, the base station 110 may indicate, in a RIS control message, spatial direction(s) and/or signal characteristics for signals reflected by the RIS 305. The RIS controller 310 may configure reconfigurable elements of the RIS 305 in accordance with the RIS control message. In some examples, the RIS control message may indicate information associated with the wireless network, such as a frame structure (e.g., uplink or downlink frame structure), time synchronization information, and/or slot (and/or symbol) boundaries, among other examples. For example, the base station 110 may transmit the RIS control message to the RIS controller 310 and data to UE 2 via the indirect link 410. The RIS control message may be received by the RIS controller 310 and terminated at the RIS 305 (e.g., not delivered to UE 2). The RIS control message may indicate, to the RIS controller 310, a configuration of the RIS 305 for a desired state (e.g., reflection angle) that enables the data reflected and/or redirected by the RIS 305 to be reliably received by UE 2. Using the communication scheme shown in FIG. 4 may improve network performance and increase reliability by providing the UEs 120 with link diversity for communicating with the base station 110.

As indicated above, FIG. 4 is provided as an example. Other examples may differ from what is described with respect to FIG. 4.

Figure 5:
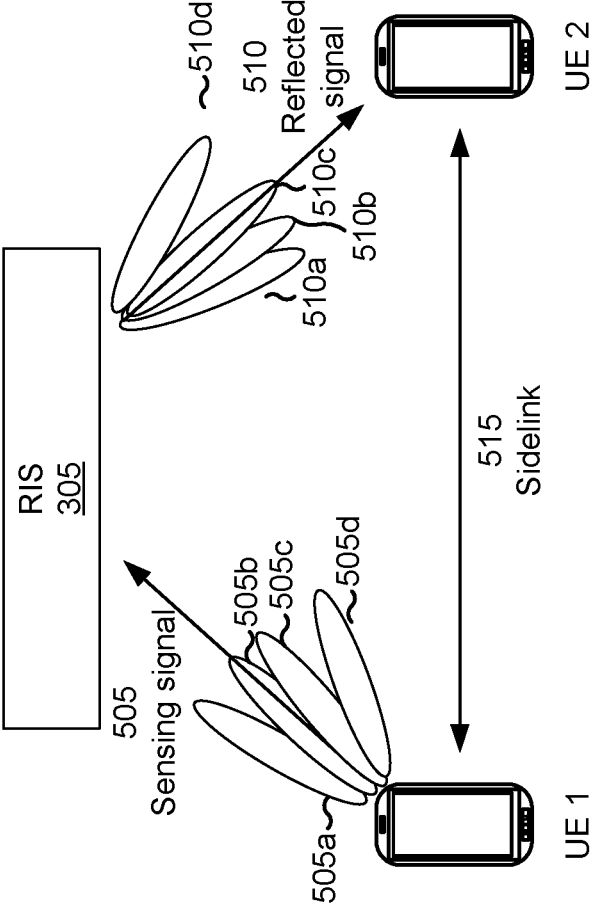
FIG. 5 is a diagram illustrating examples of RIS discovery in a wireless network, in accordance with the present disclosure.

FIG. 5 is a diagram illustrating an example 500 and 510 of RIS discovery in a wireless network, in accordance with the present disclosure.

In some examples, a RIS 305 may be deployed in a wireless network, such as wireless network 100. A base station (e.g., base station 110) may control the RIS 305 for downlink and uplink communications. The base station may have information about the RIS 305 including, for example, a location of the RIS 305, an orientation of the RIS 305, a RIS type (e.g., controllable or non-controllable) of the RIS 305, an operating frequency of the RIS 305, a control protocol for the RIS 305 (e.g., for the controllable RIS type), and/or a pattern of state change for the RIS 305 (e.g., for the non-controllable RIS type), among other examples. In some examples, the presence of the RIS 305 may be known to a UE (e.g., UE 120), and/or to other wireless nodes, such as neighboring or overlaid base stations or CPE. However, the UE (or another wireless node) may not have sufficient information regarding the RIS 305 to be able use the RIS 305 (e.g., for sidelink communications with another UE). Furthermore, due to UE mobility or a lack of positioning capability of the UE, the UE may not track the time-varying relative position of the RIS 305 with respect to the UE. In some examples, a UE (or another wireless node) may use bi-static sensing to discover a location of the RIS 305 and to acquire information about the RIS 305.

As shown in FIG. 5, example 500 shows an example of bi-static sensing for RIS discovery including a first UE 120 (e.g., UE 1) a second UE 120 (e.g., UE 2), and a RIS 305. Bi-static sensing may use two UEs, such as UE 1 and UE 2, to detect the RIS 305. For example, UE 1 may discover the RIS 305 with the aid or assistance of UE 2. UE 1 may be referred to as a Tx UE or a sensing UE, and UE 2 may be referred to as an Rx UE or an assistant UE. UE 1 may transmit a sensing signal 505 to the RIS 305. For example, UE 1 may sweep the sensing signal 505 over different beam directions 505a-505d if UE 1 does not have any prior location information for the RIS 305, or UE 1 may sweep the sensing signal 505 over a more targeted directional range if UE 1 does have more precise location information for the RIS 305. The RIS 305, in connection with receiving the sensing signal 505 transmitted from UE 1, may reflect the sensing signal 505 as a reflected signal 510. In some examples, the RIS 305 may reflect the reflected signal 510 on multiple reflection beams 510a-510d. UE 2 may monitor for the reflected signal 510 from the RIS 305. Upon receiving the reflected signal 510 (e.g., the reflected sensing signal) from the RIS 305, UE 2 may communicate with UE 1 over a sidelink 515 regarding the location of the RIS 305.

In some examples, UE 2 (e.g., the Rx UE or assistant UE) may have difficulty distinguishing between the reflected sensing signal from the RIS 305 and background reflection from other objects or another RIS (or a direct transmission of the sensing signal from UE 1). In some examples, the RIS 305 may apply a RIS modulation signature to the signal reflected by the RIS 305. The RIS modulation signature may be a pattern or sequence of modulation added to a signal redirected or reflected by the RIS 305. Wireless sensing using a RIS modulation signature may be referred to as signatured wireless sensing. UE 2 may distinguish the reflected signal from other signals received by UE 2 by detecting the RIS modulation signature in the reflected signal. However, some UEs may lack the capability of detecting a RIS modulation signature.

Some techniques and apparatuses described herein enable a first wireless node to transmit, to a RIS, a sensing signal using a first modulation signature. The RIS may receive the sensing signal modulated using the first modulation signature and redirect the sensing signal using a second modulation signature that reverses the first modulation signature. A second wireless node may receive the sensing signal redirected by the RIS and transmit a return signal related to the sensing signal to the first wireless node. The second wireless node may transmit the return signal based at least in part on decoding the sensing signal redirected by the RIS. The sensing signal redirected by the RIS may be decodable by the second wireless node based at least in part on the RIS redirecting the sensing signal using the second modulation signature that reverses the first modulation signature applied to the sensing signal by the first wireless node. The sensing signal may be undecodable by the second wireless node without being redirected by the RIS using the second modulation signature that reverses the first modulation signature. As a result, the second wireless node may decode the sensing signal only if the sensing signal is redirected by the RIS, which may prevent the second wireless node from confusing a background reflection (or direct transmission) of the sensing signal with the reflected sensing signal from the RIS. Furthermore, the second wireless node does not need to detect whether a RIS modulation signature is applied to the sensing signal to distinguish between the sensing signal reflected by the RIS and a background reflection (or direct transmission) of the sensing signal, which enables UEs that lack the capability to detect the RIS modulation signature to be used (e.g., as Rx UEs or assistant UEs) to support bi-static wireless sensing for RIS discovery. That is, techniques and apparatuses described herein enable back-compatible RIS discovery via signature wireless sensing for a UE that lacks the capability to detect a RIS modulation signature in a received signal.

As indicated above, FIG. 5 is provided as an example. Other examples may differ from what is described with respect to FIG. 5.

Figure 6:
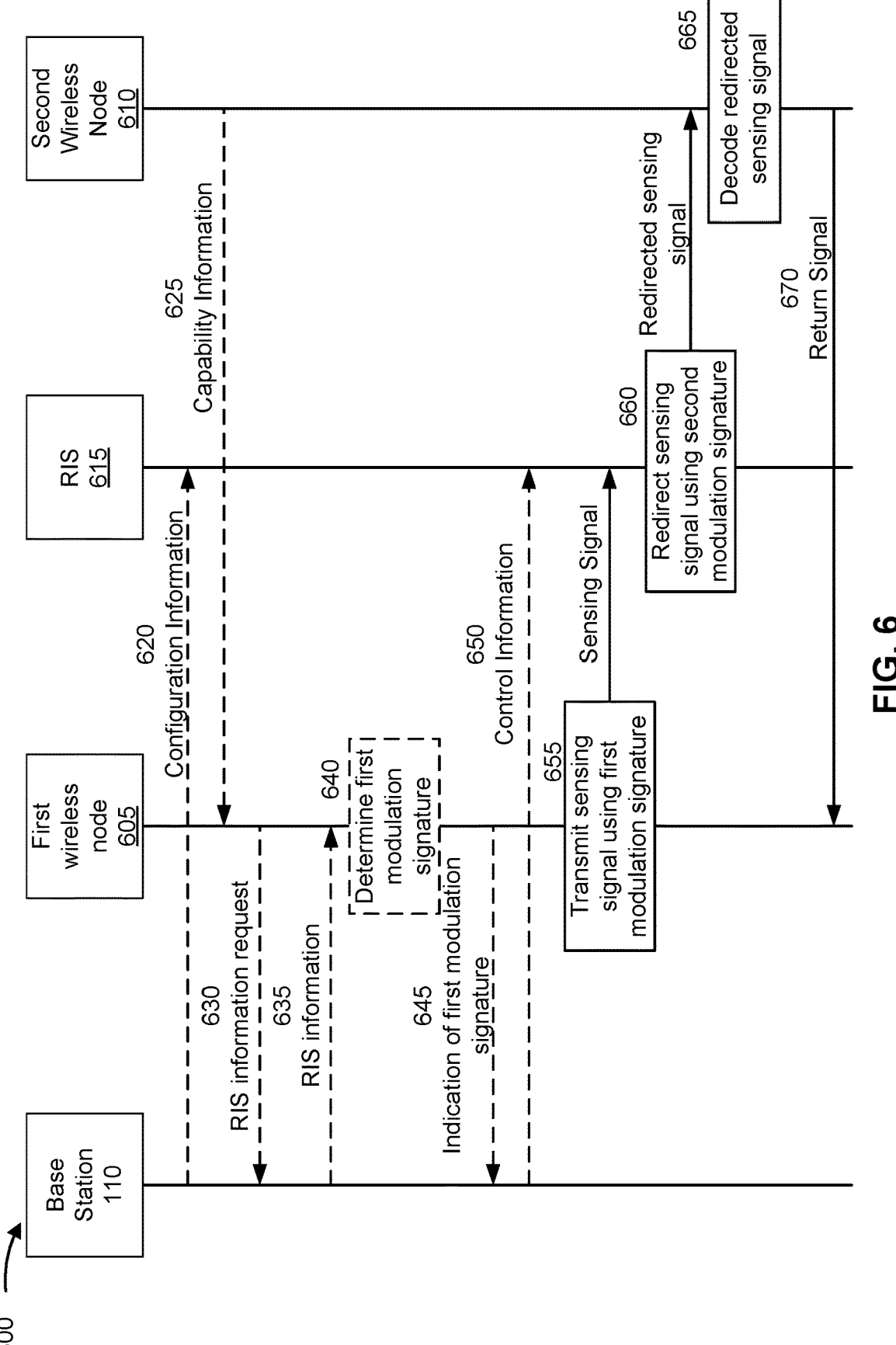
FIG. 6 is a diagram illustrating an example associated with RIS discovery using wireless sensing, in accordance with the present disclosure.

FIG. 6 is a diagram illustrating an example 600 associated with RIS discovery using wireless sensing, in accordance with the present disclosure. As shown in FIG. 6, example 600 includes communication between a base station 110, a first wireless node 605, a second wireless node 610, and a RIS 615. In some aspects, the base station 110, the first wireless node 605, the second wireless node 610, and the RIS 615 may be included in a wireless network, such as wireless network 100. The RIS 615 may be similar to the RIS 305 described in connection with FIGS. 3-5.

In some aspects, the first wireless node 605 may be a UE (e.g., UE 120). In some aspects, the first wireless node 605 may be a base station (e.g., base station 110 or another base station, such as a neighboring or overlaid base station). For example, in some aspects, the base station 110 and the first wireless node 605 may be or may be included in a same device). In some aspects, the second wireless node 610 may be a UE (e.g., UE 120). In some aspects, the second wireless node 610 may be a base station. In some aspects, the first wireless node 605 may be a first UE, and the second wireless node 610 may a second UE. For example, the first wireless node 605 may be a Tx UE or sensing UE for bi-static sensing, and the second wireless node 610 may be an Rx UE or assistant UE for bi-static sensing. In some aspects, the first wireless node 605 may be a base station, and the second wireless node 610 may be a UE.

As shown in FIG. 6, and by reference number 620, the base station 110 may transmit, to the RIS 615, configuration information associated with the RIS 615. The configuration information may include information relating to a RIS modulation signature associated with the RIS 615. "Modulation signature" may refer to a pattern or sequence of modulation added to a signal. "RIS modulation signature" may refer to a pattern or sequence of modulation added to a signal redirected by the RIS 615. The RIS modulation signature may also be referred to as a RIS watermark. The RIS modulation signature associated with the RIS 615 may be a RIS-specific modulation signature for the RIS 615. In some aspects, the modulation signature may be a RIS-specific modulation signature applied by the base station 110 to signals redirected by the RIS 705. In some aspects, if there are multiple RISs in a cell associated with the base station 110, the base station 110 may transmit, to each RIS, configuration information including an indication of a respective RIS-specific modulation signature associated with that RIS.

In some aspects, the configuration information may indicate one or more beam-specific RIS modulation signatures for the RIS 615. A beam-specific RIS modulation signature may be associated with beam states of the RIS 615 corresponding to one or more reflection beams (e.g., reflection directions) on which a signal is redirected from the RIS 615. The RIS 615 may apply a beam-specific RIS modulation signature to a signal only when redirecting the signal on one or more reflection beams (e.g., beam direction) associated with the beam-specific RIS modulation signature. In some aspects, the RIS 615 may be configured with multiple beam-specific RIS modulation signatures for multiple beam states and/or beam directions of the RIS 615.

In some aspects, the configuration information may indicate that the RIS 615 is to modulate a signal reflected or redirected by the RIS 615, in accordance with the RIS modulation signature, at symbol boundaries. The RIS modulation signature associated with the RIS 615 may be a phase modulation signature, a frequency modulation signature, a polarization modulation signature, and/or an amplitude modulation signature, among other examples. "Phase modulation signature" may refer to a pattern or sequence (e.g., a RIS-specific pattern or sequence and/or a beam-specific pattern or sequence) of phase changes or phase shifts, added to a signal that is reflected or redirected by the RIS 615. "Frequency modulation signature" may refer to a pattern or sequence (e.g., a RIS-specific pattern or sequence and/or a beam-specific pattern or sequency) of frequency changes or frequency shifts, added to a signal that is reflected or redirected by the RIS 615. "Polarization modulation signature" may refer to a pattern or sequence (e.g., a RIS-specific pattern or sequence and/or a beam-specific pattern or sequence) of polarization states (e.g., angle of polarization or polarization mode), added to a signal that is reflected or redirected by the RIS 615. "Amplitude modulation signature" may refer to a pattern or sequence (e.g., a RIS-specific pattern or sequence and/or a beam-specific pattern or sequence) of amplitude changes or amplitude shifts, added to a signal that is reflected or redirected by the RIS 615.

In some aspects, for a phase modulation signature, a common phase modulation may be applied (e.g., by the RIS 615) to a signal that is reflected and/or redirected by the RIS 615. "Common phase modulation" may refer to a phase modulation that is applied by all reconfigurable elements of the RIS 615. For example, the RIS 615 may modulate (e.g., scramble) a signal by the phase modulation signature, and the phase modulation signature may be a time-domain phase shift pattern, specific to the RIS 615, that is applied to a signal reflected or redirected by the RIS 615. The time-domain phase shift pattern may include phase changes (e.g., phase shifts) that are included in a set of phase changes (e.g., a finite set of phase changes). For example, the time-domain phase shift pattern may include phase changes from a set of phase changes that includes ±90°, ±45°, and/or ±30°, among other examples. In some aspects, in order to minimize negative effects of inter-carrier interference or inter-symbol interference, the phase changes may be applied on an OFDM symbol level (e.g., may be applied at OFDM symbol boundaries). For example, the modulation signature may modulate the signal (e.g., in phase) at each symbol of a set of symbols associated with the signal or at a subset of symbols of the set of symbols. In some aspects, the configuration information may indicate the set of symbols and/or the subset of symbols that are to be associated with the phase change. In some aspects, the modulation signature may apply the phase changes per sample or per a group of samples, and the configuration information may indicate the samples and/or the groups of samples that are to be associated with the phase changes.

For a frequency modulation signature, the RIS 615 may apply a frequency change to an impinging signal, in accordance with the frequency modulation signature associated with the RIS 705. The frequency modulation signature may identify a pattern for applying a frequency shift (e.g., by a number of subcarriers) to be applied to a signal that is reflected and/or redirected by the RIS 615. For example, the frequency modulation signature may modulate the frequency at each subcarrier of a set of subcarriers associated with the signal or at a subset of subcarriers of the set of subcarriers. In some aspects, the configuration information may indicate the set of subcarriers and/or the subset of subcarriers that are to be associated with the frequency change, and the configuration information may indicate the size of the frequency shift (e.g., the number of subcarriers) to be applied to the set of subcarriers and/or the subset of carriers.

For a polarization modulation signature, the RIS 615 may change a polarization of an impinging signal, in accordance with the polarization modulation signature associated with the RIS 615. For example, the polarization of the signal reflected by the RIS 615 may be modulated (e.g., scrambled) by the polarization modulation signature. For example, an impinging signal (e.g., a sensing signal) received by the RIS 615 may be associated with a first polarization state. The RIS 615 may modify the signal, in accordance with the polarization modulation signature, from the first polarization state as originally transmitted to a second polarization state of the signal as reflected or redirected by the RIS 705. The polarization state (e.g., the first polarization state and/or the second polarization state) may include an angle of polarization (e.g., for linear polarization) or a polarization mode (e.g., the first polarization state and the second polarization state may use different polarization modes). A polarization mode may include linear polarization, circular polarization, and/or elliptical polarization, among other examples. In some aspects, in order to minimize negative effects of inter-carrier interference or inter-symbol interference, the polarization changes may be applied (e.g., by the RIS 615) on an OFDM symbol level (e.g., may be applied at OFDM symbol boundaries). For example, the modulation signature associated with the RIS 615 may modulate the polarization of the signal at each symbol of a set of symbols associated with the signal or at a subset of symbols of the set of symbols. In some aspects, the configuration information may indicate the set of symbols and/or the subset of symbols that are to be associated with the polarization change.

For an amplitude modulation signature, the RIS 615 may attenuate the amplitude of a signal redirected or reflected by the RIS 615 in accordance with the amplitude modulation signature associated with the RIS 705. For example, at certain time intervals, the RIS 615 may attenuate the amplitude by turning off one or more reconfigurable elements (e.g., such that the reconfigurable elements that are turned off do not reflect or redirect the signal). For example, one or more reconfigurable elements of the RIS 615 may be tuned with a random phase to change a reflection angle (e.g., a beam direction) of the signal (e.g., the RIS 615 may point a beam direction to a null direction (e.g., toward the sky)) to increase the attenuation of the signal. In some aspects, the RIS 615 may attenuate the amplitude of the signal by puncturing (e.g., not reflecting or redirecting) the signal at certain time intervals in accordance with a pattern identified in the modulation signature associated with the RIS 615. For example, the signal may be modulated (e.g., by the RIS 615) with attenuation in the amplitude of the signal (e.g., where the amplitude is reduced) or with gaps (e.g., where the amplitude is zero) where no signal is received by the receiver. The pattern or sequence of the attenuation or the gaps identified in the amplitude modulation signature may be specific to the RIS 615.

As further shown in FIG. 6, and by reference number 625, in some aspects, the second wireless node 610 may transmit, and the first wireless node 605 may receive, capability information for the second wireless node 610. For example, in some aspects in which the second wireless node 610 is a UE, the second wireless node 610 may transmit UE capability information for the second wireless node 610 to the first wireless node 605. The capability information may indicate a capability of the second wireless node 610 for detecting a RIS modulation signature in a received signal. In some aspects, the first wireless node 605 may transmit a request for the capability information to the second wireless node 610, and the second wireless node 610 may transmit the capability information to the first wireless node 605 in connection with receiving the request for the capability information.

In some aspects, the operations described below in connection with FIG. 6 (e.g., including the first wireless node 605 transmitting a sensing signal using a first modulation signature and the RIS 615 redirecting the sensing signal using a second modulation signature that reverses the first modulation signature) may be performed in connection with receiving capability information from the second wireless node 610 that indicates that the second wireless node 610 is not capable of detecting a RIS modulation signature in a received signal. For example, the first wireless node 605 may determine to transmit the sensing signal using the first modulation signature based at least in part on the capability information indicating that the second wireless node 610 is not capable of detecting a RIS modulation signature. In some aspects, in connection with receiving capability information from the second wireless node 610 that indicates that the second wireless node 610 is capable of detecting a RIS modulation signature in a received signal, the first wireless node 605 may transmit a sensing signal (e.g., for bi-static wireless sensing) without modulating the wireless sensing signal using a first modulation signature, the RIS 615 may apply the RIS modulation signature associated with the RIS 615, and the second wireless node 610 may detect the RIS modulation signature to distinguish between the reflected sensing signal from the RIS 615 and background reflections of the sensing signal, instead of the operations described below in connection with FIG. 6.

In some aspects, the first wireless node 605 may not receive the capability information from the second wireless node 610 and/or the first wireless node 605, the base station 110, the RIS 615, and the second wireless node 610 may perform the operations described below in connection with FIG. 6 regardless of the capability of the second wireless node 610 to detect a RIS modulation signature in a signal.

As further shown in FIG. 6, and by reference number 630, in some aspects, the first wireless node 605 may transmit a request for RIS information to the base station 110. The first wireless node 605 transmit, to the base station 110, a request for RIS information regarding the RIS 615 and/or any other RISs within a coverage area of the base station 110. For example, the first wireless node 605 may transmit the RIS information request to the base station 110 via a radio resource control (RRC) signal, a medium access control (MAC) control element (MAC-CE), a physical uplink control channel (PUCCH) communication, or a physical random access channel (PRACH) communication.

As further shown in FIG. 6, and by reference number 635, the base station 110 may transmit RIS information to the first wireless node 605. In some aspects, the base station 110 may receive the RIS information request from the first wireless node 605, and the base station 110 may transmit the RIS information based at least in part on receiving the RIS information request from the first wireless node 605. In some aspects, the base station 110 may transmit the RIS information to the first wireless node 605 without receiving the RIS information request from the first wireless node 605. The RIS information may include RIS information for the RIS 615 and/or one or more other RISs in the coverage are of the base station 110. In some aspects, the RIS information may include a quantity of the RISs. In some aspects, the RIS information for the RIS 615 (and each other RIS 615) may include an operating frequency of the RIS 615, a location of the RIS 615, a 3-dimensional position of the RIS 615, a synchronization signal block (SSB) associated with the RIS

615, a channel state information (CSI) reference signal (CSI-RS) associated with the RIS 615, a type of the RIS 615 (e.g., controllable or non-controllable), a control protocol of the RIS 615, a pattern of state change of the RIS 615, and/or a current state of the RIS 615. The base station 110 may transmit the RIS information to the first wireless node 605 via system information, RRC signaling, a MAC-CE, and/or downlink control information (DCI) (e.g., via a physical downlink control channel (PDCCH) communication).

In some aspects, the base station 110 may transmit, to the first wireless node 605, an indication of the RIS modulation signature associated with the RIS 615. For example, the indication of the RIS modulation signature associated with the RIS 615 may be included in the RIS information transmitted to the first wireless node 605 by the base station 110. In some aspects, the base station 110 may transmit, to the first wireless node 605, an indication of a first modulation signature (e.g., a suggested first modulation signature) to be applied by the first wireless node 605 to a sensing signal transmitted by the first wireless node 605. For example, the indication of the first modulation signature may be included in the RIS information transmitted to the first wireless node 605 from the base station 110. The base station 110 may determine the first modulation signature (e.g., the suggested first modulation signature) based at least in part on the RIS modulation signature associated with the RIS 615. For example, the base station 110 may determine a first modulation signature, to be applied to a sensing signal by the first wireless node 605, that is reversed by the RIS modulation signature applied by the RIS 615 when redirecting the sensing signal, resulting in an unmodulated sensing signal being reflected or redirected from the RIS 615.

In some aspects, the base station 110 may transmit, to the first wireless node 605, an indication of a modulation capability of the RIS 615. For example, the indication of the modulation capability of the RIS 615 may be included in the RIS information transmitted to the first wireless node 605 by the base station 110. In some aspects, the indication of the modulation capability of the RIS 615 may indicate a number of OFDM symbols for which a phase change can be applied for common phase modulation by the RIS 615.

As further shown in FIG. 6, and by reference number 640, the first wireless node 605 may determine a first modulation signature to apply to a sensing signal that is to be redirected by the RIS 615 (e.g., a sensing signal for discovery of the RIS 615). The first modulation signature may be a modulation signature to be applied to the sensing signal by the first wireless node 605 that is reversed by a second sensing signal applied by the RIS 615 when redirecting the sensing signal. "Reversing" a modulation signature may refer to recovering a demodulated signal from a signal modulated using the modulation signature (e.g., recovering an original signal to which the modulation signature was applied).

In some aspects, the second modulation signature to be applied by the RIS 615 may be the RIS modulation signature associated with the RIS 615 (e.g., the RIS modulation signature indicated in the configuration information for the RIS 615), and the first modulation signature may be an inverted RIS modulation signature that is reversed by the RIS modulation signature associated with the RIS 615. An "inverted" modulation signature may refer to a pattern or sequence of modulation that reverses or is reversed by another modulation signature. An inverted modulation signature may also be referred to as an inverse modulation signature or an inverse RIS watermark. In some aspects, the second modulation signature may be a beam-specific RIS modulation signature to be applied to one or more reflection beams associated with the RIS 615, and the first modulation signature may be an inverted beam-specific RIS modulation signature that is reversed by the beam-specific RIS modulation signature applied to the one or more reflection beams associated with the RIS 615.

In some aspects, the first wireless node 605 may receive, from the base station 110 (e.g., in the RIS information), an indication of the RIS modulation signature associated with the RIS 615 (or an indication of the beam-specific RIS modulation signature associated with the RIS 615). In some aspects, based at least in part on receiving the indication of the RIS modulation signature associated with the RIS 615, the first wireless node 605 may determine the first modulation signature that is an inverted RIS modulation signature that is reversed by the RIS modulation signature associated with the RIS 615. In some aspects, based at least in part on receiving the indication of the beam-specific RIS modulation signature associated with the RIS 615, the first wireless node 605 may determine the first modulation signature that is an inverted beam-specific RIS modulation signature that is reversed by the beam-specific RIS modulation signature associated with the RIS 615.

In some aspects, the first wireless node 605 may receive, from the base station 110 (e.g., in the RIS information), an indication of a suggested first modulation signature that is an inverted RIS modulation signature that reverses the RIS modulation signature associated with the RIS 615, and the first wireless node 605 may use the suggested first modulation signature (e.g., the inverted RIS modulation signature) as the first modulation signature. In some aspects, the first wireless node 605 may receive, from the base station 110 (e.g., in the RIS information), an indication of a suggested first modulation signature that is an inverted beam-specific RIS modulation signature associated with the RIS 615, and the first wireless node 605 may use the suggested first modulation signature (e.g., the inverted beam-specific RIS modulation signature) as the first modulation signature.

In some aspects, the first wireless node 605 may determine a modulation signature associated with the first wireless node 605 to use as the first modulation signature. For example, in some aspects in which the first wireless node 605 is a first UE and the second wireless node 610 is a second UE, the first modulation signal may be a UE modulation signature associated with the UE. A UE modulation signature may be a modulation signature, applied by a UE, to a signal transmitted by the UE. In some aspects, the first wireless node 605 may receive, from the base station 110 (e.g., in the RIS information), an indication of a modulation capability of the RIS 615, and the first wireless node 605 may select the first modulation signature (e.g., the UE modulation signature) based at least in part on the modulation capability of the RIS 615. For example, the first wireless node 605 may select the first modulation signature (e.g., the UE modulation signature) based at least in part on the number of OFDM symbols for which a phase change can be applied for common phase modulation by the RIS 615. The first modulation signature (e.g., the UE modulation signature) may be a phase modulation signature, a frequency modulation signature, a polarization modulation signature, and/or an amplitude modulation signature, among other examples.

As further shown in FIG. 6, and by reference number 645, in some aspects, the first wireless node 605 may transmit, to the base station 110, an indication of the first modulation signature. In some aspects, the first wireless node 605 may transmit, to the base station 110, an indication of a UE modulation signature selected as the first modulation signature. In some aspects, the first wireless node 605 may transmit, to the base station 110, an indication of an inverted RIS modulation signature (or inverted beam-specific RIS modulation signature) selected as the first modulation signature by the first wireless node 605. Additionally, or alternatively, the first wireless node 605 may transmit, to the base station 110, information relating to the sensing signal to be transmitted by the first wireless node 605. For example, the information relating to the sensing signal may include a waveform, bandwidth, and/or sensing direction, among other examples. In some aspects, the first wireless node 605 may determine the information (e.g., waveform, bandwidth, and/or sensing direction, among other examples) for the sensing signal based at least in part on the RIS information received from the base station 110.

As further shown in FIG. 6, and by reference number 650, the base station 110 may transmit, to the RIS 615, control information for the RIS 615. For example, the base station 110 may transmit the control information to the RIS 615 in a RIS control message. In some aspects, the control information may indicate an adjustment to the RIS modulation signature to be applied by the RIS 615. For example, the base station 110 may determine the adjustment to the RIS modulation signature for the RIS 615 based at least in part on an indication of a UE modulation signal and/or information relating to the sensing signal received from the first wireless node 605. In some aspects, in connection with receiving an indication from the first wireless node 605 that the first modulation signal is a UE modulation signal associated with the first wireless node 605, the base station 110 may determine a second modulation signal that is an inverted UE modulation signal that reverses the UE modulation signal associated with the first wireless node 605. The base station 110 may then transmit (e.g., in the control information) an indication of the second modulation signal (e.g., the inverted UE modulation signal) to the RIS 615.

Additionally, or alternatively, the control information may indicate a configuration of one or more states for the RIS 615 for redirecting a sensing signal. In some aspects, the base station 110 may transmit, to the RIS 615, control information to control the RIS 615 to perform beam sweeping by redirecting the sensing signal on multiple different reflection beams (e.g., in multiple different beam directions). In some aspects, if the RIS 615 is controllable by the first wireless node 605, the first wireless node 605 may transmit the control information to the RIS 615 e.g., to control the state changes of the RIS 615 for reflecting the sensing signal). For example, the first wireless node 605 may sweep a RIS control message including the control information over potential locations for the RIS 615.

As further shown in FIG. 6, and by reference number 655, the first wireless node 605 may transmit a sensing signal (e.g., a first signal) using the first modulation signature. In some aspects, the first modulation signature may be an inverted RIS modulation signature that is reversed by the RIS modulation signature associated with the RIS 615. In some aspects, the first modulation signature may be an inverted beam-specific RIS modulation signature that is reversed by the beam-specific RIS modulation signature associated with the RIS 615. In some aspects, the first modulation signature may be a modulation signature associated with the first wireless node 605, such as a UE modulation signature associated with the first wireless node 605.

In some aspects, the first wireless node 605 may transmit a burst of multiple transmissions of the sensing signal on different beams (e.g., in different beam directions), and the first wireless node 605 may apply the first modulation signature to each transmission of the sensing signal. The first wireless node 605 may sweep the sensing signal in directions based at least in part on the RIS information for the RIS 615. For example, if the first wireless node 605 receives location information for the RIS 615 in the RIS information, the first wireless node 605 may sweep the sensing signal over an associated directional range associated with the location information for the RIS 615 (e.g., over an area close to approximately where the RIS 615 may be located according to the RIS information). If the first wireless node 605 does not receive location information for the RIS 615, the first wireless node 605 may sweep the sensing signal over a larger directional range to attempt to discover the location of the RIS 615.

In some aspects, the first wireless node 605 may sweep the sensing signal while the RIS 615 is controlled to change the state of the RIS 615 (e.g., the state of the reconfigurable elements of the RIS 615). For example, the RIS 615 may be controlled by one or more RIS control messages from the base station 110 or the first wireless node 605 to change states to redirect the sensing signal on different reflection beams from the RIS 615 (e.g., to perform beam sweeping with the redirected sensing signal). In some aspects, there may be a time gap (e.g., for processing and RIS reconfiguration) between a control message that controls the RIS 615 to change state to a new state and a burst of sensing signal transmissions for the RIS 615 at the new state. In some aspects, the first wireless node 605 may transmit bursts of sensing signal transmissions (e.g., sweeping of the sensing signal) at different RIS states until a return signal is received from the second wireless node 610 indicating that the second wireless node 610 has received a redirected sensing signal.

In some aspects, the first wireless node 605 may determine a sensing signal duration and periodicity based at least in part on a state change pattern and periodicity of the RIS 615. In some aspects, the first wireless node 605 may determine the sensing signal (e.g., the waveform, bandwidth, and/or sensing direction, among other examples) and the RIS control signal (e.g., time and/or frequency resources and/or format) based at least in part on the RIS information. In some aspects, the base station 110 may allocate sensing signal resources to the first wireless node 605, and the first wireless node 605 may receive a configuration and/or indication of dedicated sensing signal resources for the RIS discovery. In some aspects, the base station 110 may indicate, to the first wireless node 605, sensing signal resources including time and/or frequency resources for transmitting the sensing signal, the sensing signal waveform, and/or resources (e.g., time and/or frequency resources) for sidelink communications between the second wireless node 610 and the first wireless node 605. In some aspects, the second wireless node 610 may also receive the configuration and/or indication of the sensing signal resources for the RIS discovery.

As further shown in FIG. 6, and by reference number 660, the RIS 615 may redirect the sensing signal using a second modulation signature that reverses the first modulation signature. The sensing signal transmitted by the first wireless node 605 may be modulated (e.g., scrambled) with the first modulation signature. The RIS 615 may receive the sensing signal (e.g., at least one sensing signal from a burst of sensing signal transmissions from the first wireless node 605), and the RIS 615 may redirect the sensing signal and apply the second modulation signature to the sensing signal. The second modulation signature may reverse the first modulation signature applied to the sensing signal by the first wireless node 605, resulting in a redirected sensing signal that is no longer modulated with the first modulation signal (e.g., an unscrambled sensing signal).

In some aspects, if the first modulation signature applies a phase shift or phase change to the sensing signal, the second modulation signature applied by the RIS 615 may reverse the phase shift or phase change applied to the sensing signal by the first wireless node 605 in accordance with the first modulation signature. In some aspects, if the first modulation signature applies a frequency shift to the sensing signal, the second modulation signature applied by the RIS 615 may reverse the frequency shift applied to the sensing signal by the first wireless node 605 in accordance with the first modulation signature. In some aspects, if the first modulation signature applies a change to the polarization of the sensing signal, the second modulation signature applied by the RIS 615 may reverse the change to the polarization of the sensing signal applied by the first wireless node 605 in accordance with the first modulation signature. In some aspects, if the first modulation signature applies a change to the amplitude of the sensing signal, the second modulation signature applied by the RIS 615 may reverse the change to the amplitude of the sensing signal applied by the first wireless node 605 in accordance with the first modulation signature.

In some aspects, the second modulation signature may be the RIS modulation signature associated with the RIS 615, and the first modulation signature may be the inverted RIS modulation signature that is reversed by the RIS modulation signature associated with the RIS 615. In some aspects, the RIS 615 may apply the second modulation signature (e.g., the RIS modulation signature) that reverses the first modulation signature for all reflection beams on which the sensing signal is reflected or redirected.

In some aspects, the second modulation signature may be a beam-specific RIS modulation signature that is applied to one or more reflection beams (e.g., reflection directions) associated with the RIS 615, and the first modulation signature may be the inverted beam-specific RIS modulation signature that is reversed by the beam specific RIS modulation signature. For example, if the second modulation signal is the beam-specific RIS modulation signature, the RIS 615 may change the RIS state to perform beam sweeping of the redirected sensing signal over a set of reflection beams, and the RIS 615 may apply the second modulation signature (e.g., the beam-specific RIS modulation signature) to reverse the first modulation signature on a subset of reflection beams (e.g., the one or more reflection beams associated with the beam-specific RIS modulation signature) in the set of reflection beams. In some aspects, the RIS 615 and/or the base station 110 controlling the RIS 615 may have information regarding one or more reflection beams which may redirect or reflect the sensing signal to the second wireless node 610, and RIS 615 may apply the second modulation signal (e.g., the beam-specific RIS modulation signature) only for one or more reflection beams which may redirect or reflect the sensing signal to the second wireless node 610. For example, the RIS 615 may not reverse the first modulation signal for one or more reflection beams that are not expected to reach the second wireless node 610.

In some aspects, the first modulation signature may be a UE modulation signature associated with the first wireless node 605, and the second modulation signature may be an inverted UE modulation signature that reverses the UE modulation signature associated with the first wireless node 605. In some aspects, the RIS 615 may change RIS states to perform beam sweeping of the redirected sensing signal over a set of reflection beams. In some aspects, the RIS 615 may apply the second modulation signature that reverses the first modulation signature for all reflection beams from the RIS 615. In some aspects, the RIS 615 may apply the second modulation signature to a subset of reflection beams in the set of reflection beams. For example, the RIS 615 and/or the base station 110 controlling the RIS 615 may have information regarding one or more reflection beams which may redirect or reflect the sensing signal to the second wireless node 610, and RIS 615 may apply the second modulation signal to the sensing signal only when the sensing signal is redirected or reflected on the one or more reflection beams which may redirect or reflect the sensing signal to the second wireless node 610. For example, the RIS 615 may not reverse the first modulation signal for one or more reflection beams that are not expected to reach the second wireless node 610.

As further shown in FIG. 6, and by reference number 665, the second wireless node 610 may receive the sensing signal redirected from the RIS 615, and the second wireless node 610 may decode the redirected sensing signal. In some aspects, the second wireless node 610 may monitor for the sensing signal based at least in part on the sensing signal resources configured for the first wireless node 605 to transmit the sensing signal. The sensing signal may be decodable by the second wireless node 610 based at least in part on the RIS 615 redirecting the signal using the second modulation signature that reverses the first modulation signature applied by the first wireless node 605. For example, the sensing signal, when transmitted by the first wireless node 605 using the first modulation signature, may be a scrambled sensing signal that is undecodable by the second wireless node 610 before being redirected by the RIS 615 using the second modulation signature that reverses the first modulation signature. The RIS 615 redirecting the sensing signal using the second modulation signature that reverses the first modulation signature may result in an unscrambled sensing signal that is decodable by the second wireless node 610.

In some aspects, the second wireless node 610 may determine whether a detected/received signal (e.g., a detected/received sensing signal) is decodable by the second wireless node 610 based at least in part on a measurement of the signal performed by the second wireless node 610. For example, the second wireless node 610 may measure the RSRP of the signal and determine whether the signal is decodable by the second wireless node 610 based at least in part on a determination of whether the RSRP measurement of the signal satisfies a threshold. In some aspects, in a case in which the second wireless node 610 receives a scrambled sensing signal (e.g., a sensing signal modulated using the first modulation signature), the RSRP measurement may not satisfy the threshold, and the second wireless node 610 may determine that the signal is undecodable. In some aspects, when the second wireless node 610 receives an unscrambled sensing signal (e.g., a sensing signal transmitted by the first wireless node 605 using the first modulation signature that has been redirected by the RIS 615 using the second modulation signature to reverse the first modulation signature), the second wireless node 610 may determine that the RSRP measurement satisfies the threshold, and the second wireless node 610 may decode the unscrambled sensing signal. This may prevent the second wireless node 610 from decoding a sensing signal that has been reflected by an object other than the RIS 615 or received directly from the first wireless node 605 (e.g., via a line of sight (LoS) path). Such sensing signals that are not reflected by the RIS 615 using the second modulation signature may be appear as interference to the second wireless node 610 and may be disregarded by the second wireless node 610.

As further shown in FIG. 6, and by reference number 670, the second wireless node 610 may transmit, to the first wireless node 605, a return signal (e.g., a second signal) related to the sensing signal. The first wireless node 605 may receive the return signal transmitted by the second wireless node 610. The second wireless node 610 may transmit the return signal based at least in part on decoding the sensing signal (e.g., the redirected sensing signal from the RIS 615). The return signal may indicate that the second wireless node 610 has received a redirected sensing signal from the RIS 615. In some aspects, the second wireless node 610 may transmit the return signal over a sidelink communication channel. For example, the second wireless node 610 may transmit the return signal to the first wireless node 605 using allocated resources (e.g., time and/or frequency resources) for sidelink communications between the second wireless node 610 and the first wireless node 605.

The first wireless node 605 may determine a relative location of the RIS 615 with respect to the first wireless node 605 and/or a RIS state of the RIS 615 for communications with the second wireless node 610 based at least in part on the return signal. For example, based at least in part on the timing of the return signal, the first wireless node 605 may identify which beam direction for the sensing signal resulted in the sensing signal that was redirected to the second wireless node 610 and/or which RIS state for the RIS 615 resulted in the redirected sensing signal that was received (and decoded) by the second wireless node 610. In some aspects, the first wireless node 605 may then use the RIS 615 for communications (e.g., sidelink communications) with the second wireless node 610 and/or one or more other wireless nodes.

As described above, the first wireless node 605 may transmit a sensing signal using a first modulation signature. The RIS 615 may receive the sensing signal modulated using the first modulation signature and redirect the sensing signal using a second modulation signature that reverses the first modulation signature. The second wireless node 610 may receive the sensing signal redirected by the RIS and transmit a return signal related to the sensing signal to the first wireless node 605. The second wireless node 610 may transmit the return signal based at least in part on decoding the sensing signal redirected by the RIS 615. The sensing signal redirected by the RIS 615 may be decodable by the second wireless node 610 based at least in part on the RIS 615 redirecting the sensing signal using the second modulation signature that reverses the first modulation signature applied to the sensing signal by the first wireless node 605. The sensing signal may be undecodable by the second wireless node 610 without being redirected by the RIS 615 using the second modulation signature that reverses the first modulation signature. As a result, the second wireless node 610 may decode the sensing signal only if the sensing signal is redirected by the RIS 615, which may prevent the second wireless node 610 from confusing a background reflection (or direct transmission) of the sensing signal with the reflected sensing signal from the RIS 615. Furthermore, the second wireless node does not need to detect whether a RIS modulation signature is applied to the sensing signal to distinguish between the sensing signal reflected by the RIS 615 and a background reflection (or direct transmission) of the sensing signal, which enables wireless nodes (e.g., UEs) that lack the capability to detect the RIS modulation signature to be used (e.g., as Rx UEs or assistant UEs) to support bi-static wireless sensing for RIS discovery.

As indicated above, FIG. 6 is provided as an example. Other examples may differ from what is described with respect to FIG. 6.

Figure 7:
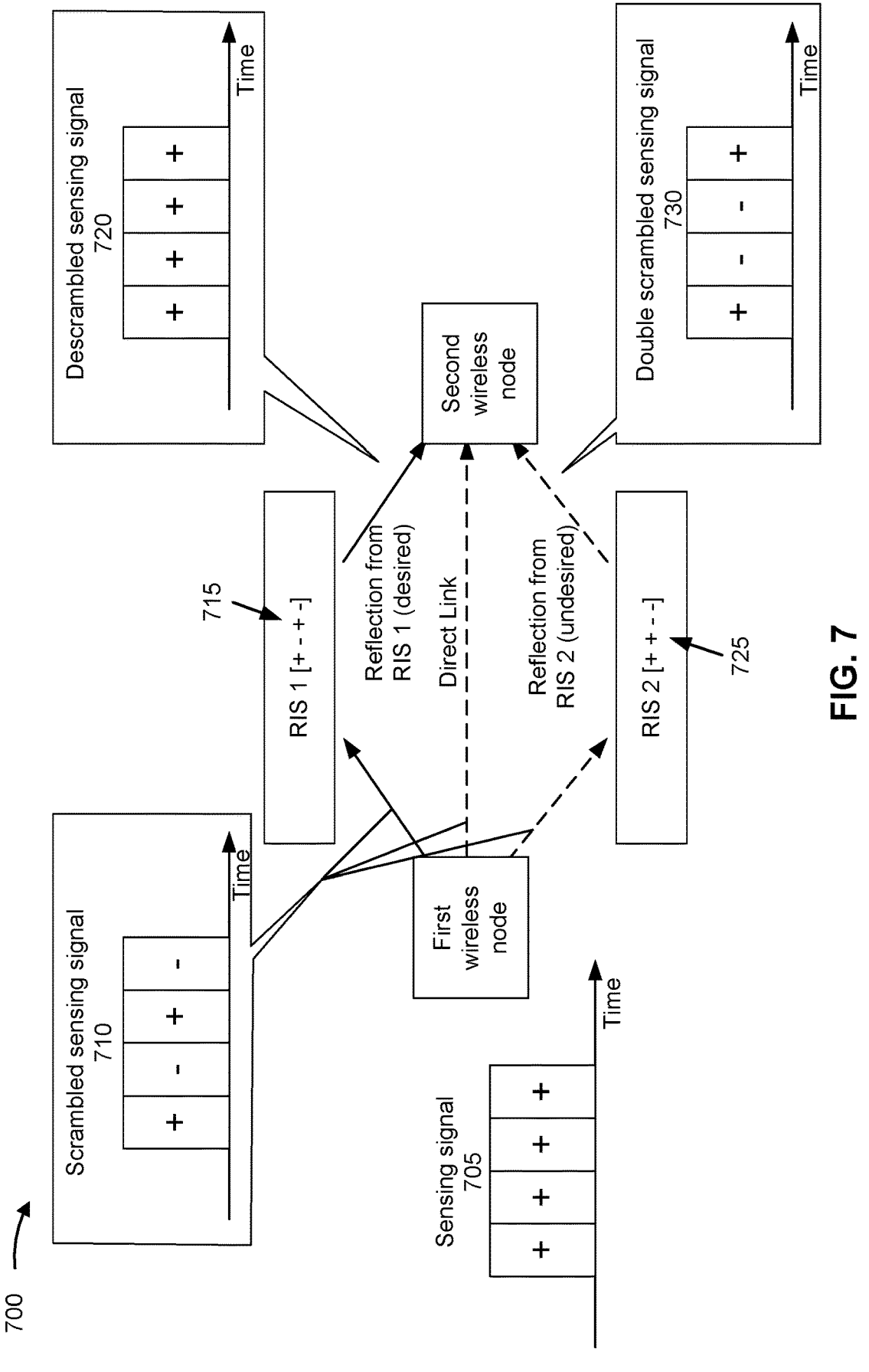
FIG. 7 is a diagram illustrating an example associated with RIS discovery using wireless sensing with inverse RIS watermarking, in accordance with the present disclosure.

FIG. 7 is a diagram illustrating an example 700 associated with RIS discovery using wireless sensing with inverse RIS watermarking, in accordance with the present disclosure. As shown in FIG. 7, example 700 includes communication between a first wireless node, a second wireless node, a first RIS (e.g., RIS 1), and a second RIS (e.g., RIS 2). In some aspects, the first wireless node may be a UE. In some aspects, the first wireless node may be a base station. In some aspects, the second wireless node 610 may be a UE. In some aspects, the second wireless node may be a base station. In some aspects, the first wireless node may be a first UE, and the second wireless node may be a second UE. For example, the first wireless node may be a Tx UE or a sensing UE for bi-static sensing, and the second wireless node may be an Rx UE or an assistant UE for bi-static sensing. In some aspects, the first wireless node may be a base station, and the second wireless node may be a UE.

As shown in FIG. 7, the first wireless node may transmit a scrambled sensing signal for the first RIS. The scrambled sensing signal may be scrambled by the first wireless node using a first modulation signature. In some aspects, the first modulation signature may scramble the sensing signal with a phase modulation sequence/pattern, amplitude modulation sequence/pattern, polarization modulation sequence/pattern, and/or frequency modulation sequence/pattern. In some aspects, the modulation sequence/pattern of the first modulation signature may be specific to the RIS of interest (e.g., RIS 1). For example, the first modulation pattern may be an inverted RIS modulation signature of the RIS modulation signature associated with the first RIS. As shown by reference number 705, the phases of the symbols in an original sensing signal (e.g., without being modulated using the first modulation signature) may be represented as [++++], wherein "+" represents the original phase for an OFDM symbol of the sensing signal. As shown by reference number 710, the scrambled sensing signal may be generated by applying the first modulation signature [+−+−] to the sensing signal, where "+" represents no phase shift for an OFDM symbol and "−" represents a phase shift for an OFDM symbol.

The first RIS (e.g., the RIS of interest for the RIS discovery) may receive the scrambled sensing signal transmitted by the first wireless node, and may redirect the scrambled sensing signal using a second modulation signature that reverses the first modulation signature. For example, the second modulation signature may be a RIS-specific modulation signature for the first RIS and the first modulation signature may be an inverted RIS modulation signature that is reversed by the RIS-specific modulation signature for the first RIS. As shown by reference number 715, the first RIS may apply the second modulation signature [+−+−] to the scrambled sensing signal, wherein "+" represents no phase shift for an OFDM symbol and "−" represents a phase shift for an OFDM symbol (e.g., back to the original phase for that symbol). As shown by reference number 720, redirection or reflection of the scrambled sensing signal using the second modulation signature by the first RIS reverses the first modulation signature, resulting in a descrambled sensing signal with the OFDM symbols having the original phases [+++]. The second wireless node may receive and decode the descrambled sensing signal reflected from the first RIS. The descrambled sensing signal may be decodable by the second wireless node because of the descrambling performed by the first RIS when the first RIS redirects the sensing signal. The second wireless node may be capable of detecting the first RIS by receiving and decoding the descrambled sensing signal, even if the second wireless node is a UE that is not capable of detecting a RIS modulation signature.

In some aspects, the scrambled sensing signal may be received by the second wireless node via a direct link from the first wireless node. The scrambled sensing signal received by the second wireless node via the direct link may not be unscrambled by the first RIS, and may be undecodable by the second wireless node due to the scrambling (e.g., the first modulation signature) applied to the sensing signal by the UE 1. In some aspects, the scrambled sensing signal may be reflected by the second RIS. The second RIS may apply a third modulation signature when redirecting the sensing signal. For example, the third modulation signature may be a RIS modulation signature associated with the second RIS. However, the first modulation signature, which is reversed by the second modulation signature associated with the first RIS (e.g., the RIS of interest), may not be reversed by the third modulation signature applied by the second RIS. As shown by reference number 725, the second RIS may apply the third modulation signature [++−−], where "+" represents no phase shift for an OFDM symbol and "−" represents a phase shift for an OFDM symbol. As shown by reference number 730, reflection or redirection of the scrambled sensing signal by the second RIS using the third modulation signature may result in a double scrambled sensing signal with a phase shift pattern of [+−−+] for the OFDM symbols. If the second wireless node receives a reflection of the sensing signal from the second RIS (e.g., the undesired RIS), the double scrambled sensing signal reflected from the second RIS may not be decodable by the second wireless node. Direct path reception of the sensing signal or reflection by an un-desired RIS (or non-RIS) object may not be detected by the second wireless node and may appear as interference to the second wireless node.

As indicated above, FIG. 7 is provided as an example. Other examples may differ from what is described with respect to FIG. 7.

FIG. 8 is a diagram illustrating an example process 800 performed, for example, by a first wireless node, in accordance with the present disclosure. Example process 800 is an example where the first wireless node (e.g., first wireless node 605) performs operations associated with RIS discovery using wireless sensing.

As shown in FIG. 8, in some aspects, process 800 may include transmitting, to a RIS, a first signal modulated using a first modulation signature, wherein the first modulation signature is an inverted modulation signature associated with a second modulation signature to be applied by the RIS (block 810). For example, the first wireless node (e.g., using communication manager 1120 and/or transmission component 1104, depicted in FIG. 11) may transmit, to a RIS, a first signal using a first modulation signature, wherein the first modulation signature is an inverted modulation signature associated with a second modulation signature to be applied by the RIS, as described above.

As further shown in FIG. 8, in some aspects, process 800 may include receiving, from a second wireless node, a second signal indicating that the first signal has been redirected by the RIS and received by the second wireless node (block 820). For example, the first wireless node (e.g., using communication manager 1120 and/or reception component 1102, depicted in FIG. 11) may receive, from a second wireless node, a second signal indicating that the first signal has been redirected by the RIS and received by the second wireless node, as described above.

Process 800 may include additional aspects, such as any single aspect or any combination of aspects described below and/or in connection with one or more other processes described elsewhere herein.

In a first aspect, transmitting the first signal using the first modulation signature includes modulating the first signal using the first modulation signature such that the first signal is undecodable unless the first signal is modulated using the second modulation signature to reverse the first modulation signature.

In a second aspect, alone or in combination with the first aspect, the second modulation signature is a RIS modulation signature associated with the RIS and the first modulation signature is an inverted RIS modulation signature that is reversed by the RIS modulation signature associated with the RIS.

In a third aspect, alone or in combination with one or more of the first and second aspects, the second modulation signature is a beam-specific RIS modulation associated with the RIS, and the first modulation signature is an inverted beam-specific RIS modulation signature that is reversed by the beam-specific RIS beam modulation signature.

In a fourth aspect, alone or in combination with one or more of the first through third aspects, the first wireless node is a first UE and the second wireless node is a second UE.

In a fifth aspect, alone or in combination with one or more of the first through fourth aspects, process 800 includes receiving, from a base station, information associated with the RIS (block 840).

In a sixth aspect, alone or in combination with one or more of the first through fifth aspects, process 800 includes transmitting, to the base station, a request for the information associated with the RIS (block 830), and receiving the information is based at least in part on transmitting the request for the information.

In a seventh aspect, alone or in combination with one or more of the first through sixth aspects, the second modulation signature is a RIS modulation signature associated with the RIS and the first modulation signature is an inverted RIS modulation signature that is reversed by the RIS modulation signature associated with the RIS, and the information includes at least one of an indication of the RIS modulation signature or an indication of the inverted RIS modulation signature.

In an eighth aspect, alone or in combination with one or more of the first through seventh aspects, the second modulation signature is a beam-specific RIS modulation signature associated with the RIS and the first modulation signature is an inverted beam-specific RIS modulation signature that is reversed by the beam-specific RIS modulation signature, and the information includes at least one of an indication of the beam-specific RIS modulation signature or an indication of the inverted beam-specific RIS modulation signature.

In a ninth aspect, alone or in combination with one or more of the first through eighth aspects, the first modulation signature is a UE modulation signature associated with the first UE and the second modulation signature is an inverted UE modulation signature that reverses the UE modulation signature associated with the first UE.

In a tenth aspect, alone or in combination with one or more of the first through ninth aspects, process 800 includes determining the UE modulation signature based at least in part on a modulation capability of the RIS indicated in the information associated with the RIS (block 850), and transmitting, to the base station, an indication of the UE modulation signature (block 860).

In an eleventh aspect, alone or in combination with one or more of the first through tenth aspects, the RIS redirects the first signal on a set of reflection beams, and the RIS redirects the first signal using the inverted UE modulation signature on a subset of reflection beams of the set of reflection beams.

In a twelfth aspect, alone or in combination with one or more of the first through eleventh aspects, process 800 includes receiving, from the second wireless node, an indication of a RIS modulation signature detection capability of the second wireless node, and transmitting the first signal using the first modulation signature is based at least in part on the indication of the RIS modulation signature detection capability of the second wireless node.

In a thirteenth aspect, alone or in combination with one or more of the first through twelfth aspects, transmitting the first signal using the first modulation signature includes sweeping the first signal over a plurality of beam directions, and the second signal indicates a beam direction associated with the RIS in the plurality of beam directions.

In a fourteenth aspect, alone or in combination with one or more of the first through thirteenth aspects, the second signal further indicates a RIS state associated with the RIS.

In a fifteenth aspect, alone or in combination with one or more of the first through fourteenth aspects, the first wireless node is a base station and the second wireless node is a UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
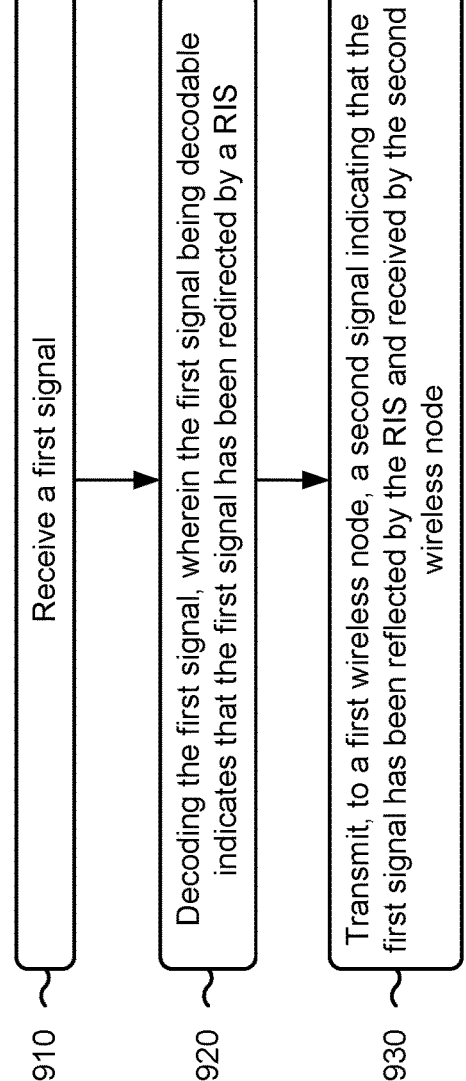
FIG. 9 is a diagram illustrating an example process performed by a wireless node associated with RIS discovery using wireless sensing, in accordance with the present disclosure.

FIG. 9 is a diagram illustrating an example process 900 performed, for example, by a second wireless node, in accordance with the present disclosure. Example process 900 is an example where the second wireless node (e.g., second wireless node 610) performs operations associated with RIS discovery using wireless sensing.

As shown in FIG. 9, in some aspects, process 900 may include receiving a first signal (block 910). For example, the second wireless node (e.g., using communication manager 1120 and/or reception component 1102, depicted in FIG. 11) may receive a first signal, as described above.

As further shown in FIG. 9, in some aspects, process 900 may include decoding the first signal, wherein the first signal being decodable indicates that the first signal has been redirected by a RIS (block 920). For example, the second wireless node (e.g., using communication manager 1120 and/or transmission component 1104, depicted in FIG. 11) may decode the first signal, wherein the first signal being decodable indicates that the first signal has been redirected by a RIS, as described above.

As further shown in FIG. 9, in some aspects, process 900 may include transmitting, to a first wireless node and based at least in part on decoding the first signal, a second signal indicating that the first signal has been reflected by the RIS and received by the second wireless node (block 930). For example, the second wireless node (e.g., using communication manager 1120 and/or transmission component 1104, depicted in FIG. 11) may transmit, to a first wireless node and based at least in part on decoding the first signal, a second signal indicating that the first signal has been reflected by the RIS and received by the second wireless node, as described above.

Process 900 may include additional aspects, such as any single aspect or any combination of aspects described below and/or in connection with one or more other processes described elsewhere herein.

In a first aspect, the first signal is undecodable by the first wireless node before the RIS redirects the first signal using the second modulation signature that reverses the first modulation signature.

In a second aspect, alone or in combination with the first aspect, the second signal indicates a beam direction associated with the RIS.

In a third aspect, alone or in combination with one or more of the first and second aspects, the second signal indicates a RIS state associated with the RIS.

In a fourth aspect, alone or in combination with one or more of the first through third aspects, the first wireless node is a first UE and the second wireless node is a second UE.

In a fifth aspect, alone or in combination with one or more of the first through fourth aspects, process 900 includes transmitting, to the first wireless node, an indication of a RIS modulation signature detection capability of the second wireless node.

In a sixth aspect, alone or in combination with one or more of the first through fifth aspects, the first wireless node is a UE and the second wireless node is a base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a RIS, in accordance with the present disclosure. Example process 1000 is an example where the RIS (e.g., RIS 615) performs operations associated with RIS discovery using wireless sensing.

As shown in FIG. 10, in some aspects, process 1000 may include receiving, from a first wireless node, a sensing signal modulated by a first modulation signature (block 1010). For example, the RIS (e.g., using communication manager 1420 and/or reception component 1402, depicted in FIG. 14) may receive, from a first wireless node, a sensing signal modulated by a first modulation signature, as described above.

As further shown in FIG. 10, in some aspects, process 1000 may include redirecting the sensing signal modulated using a second modulation signature that reverses the first modulation signature (block 1020). For example, the RIS (e.g., using communication manager 1420, reflection component 1408, and/or modulation component 1410, depicted in FIG. 14) may redirect the sensing signal modulated using a second modulation signature that reverses the first modulation signature, as described above.

Process 1000 may include additional aspects, such as any single aspect or any combination of aspects described below and/or in connection with one or more other processes described elsewhere herein.

In a first aspect, the sensing signal is decodable by a second wireless node based at least in part on the sensing signal being redirected using the second modulation signature that reverses the first modulation signature.

In a second aspect, alone or in combination with the first aspect, process 1000 includes receiving an indication of the second modulation signature (block 1030).

In a third aspect, alone or in combination with one or more of the first and second aspects, the second modulation signature is a RIS modulation signature associated with the RIS and the first modulation signature is an inverted RIS modulation signature that is reversed by the RIS modulation signature associated with the RIS.

In a fourth aspect, alone or in combination with one or more of the first through third aspects, the second modulation signature is a beam-specific RIS modulation signature applied to one or more reflection beams associated with the RIS and the first modulation signature is an inverted beam-specific RIS modulation signature that is reversed by the beam-specific RIS modulation signature.

In a fifth aspect, alone or in combination with one or more of the first through fourth aspects, the first modulation signature is a UE modulation signature associated with the first wireless node and the second modulation signature is an inverted UE modulation signature that reverses the UE modulation signature.

In a sixth aspect, alone or in combination with one or more of the first through fifth aspects, redirecting the sensing includes redirecting the sensing signal on one or more first reflection beams using the second modulation signature that reverses the first modulation signature, and redirecting the sensing signal on one or more second reflection beams without using the second modulation signature that reverses the first modulation signature.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
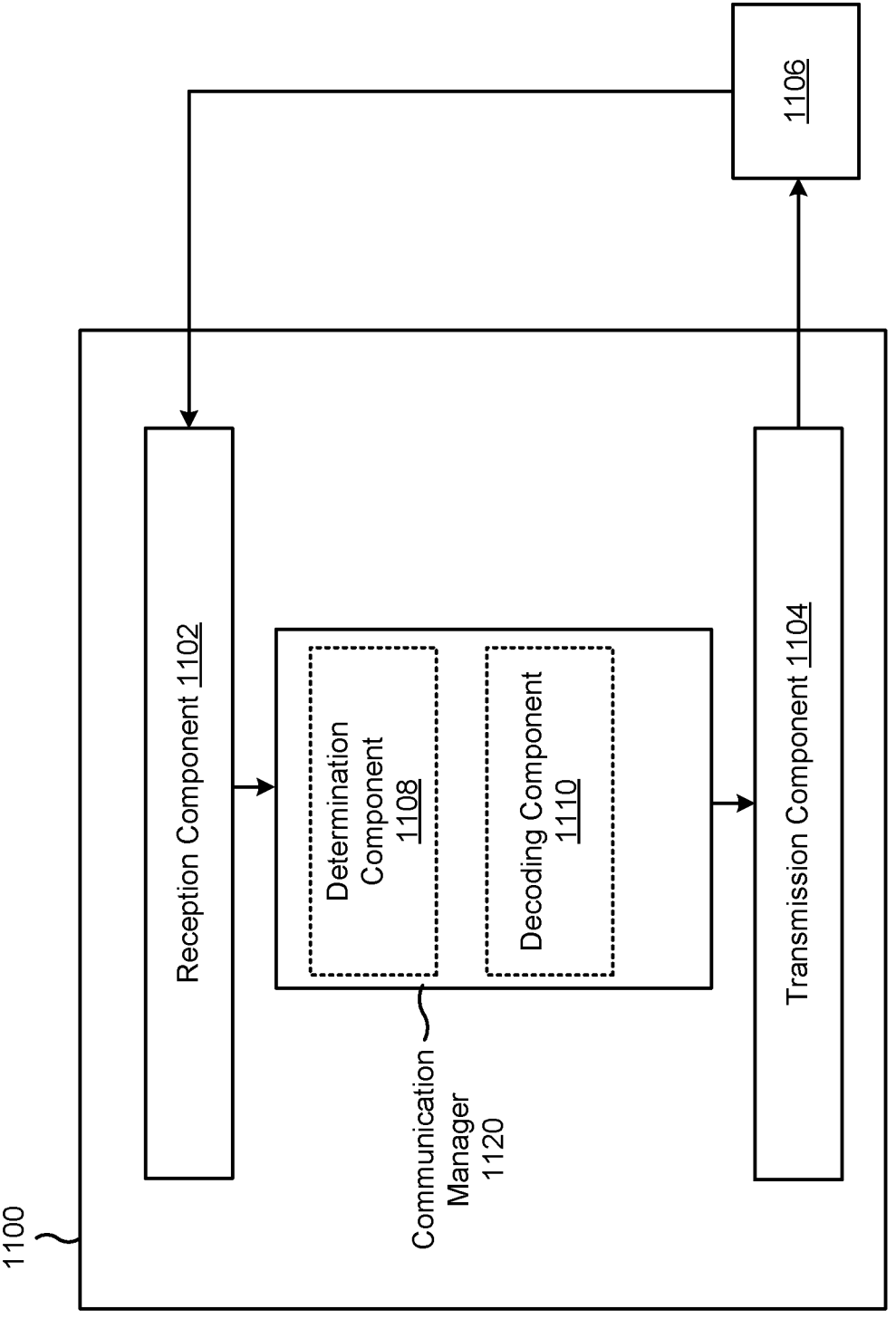
FIG. 11 is a diagram of an example apparatus for wireless communication, in accordance with the present disclosure.

FIG. 11 is a diagram of an example apparatus 1100 for wireless communication. The apparatus 1100 may be a wireless node, or a wireless node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1120. The communication manager 1120) may include at least one of a determination component 1108 and/or a decoding component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the wireless node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the wireless node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the wireless node described in connection with FIG. 2. In some aspects, the transmission component 1104 may be co-located with the reception component 1102 in a transceiver.

In some aspects, the transmission component 1104 may transmit, to a RIS, a first signal modulated using a first modulation signature, wherein the first modulation signature is an inverted modulation signature associated with a second modulation signature to be applied by the RIS. The reception component 1102 may receive, from a second wireless node, a second signal indicating that the first signal has been redirected by the RIS and received by the second wireless node.

The reception component 1102 may receive, from a base station, information associated with the RIS.

The transmission component 1104 may transmit, to the base station, a request for the information associated with the RIS, wherein receiving the information is based at least in part on transmitting the request for the information.

The determination component 1108 may determine the UE modulation signature based at least in part on a modulation capability of the RIS indicated in the information associated with the RIS.

The transmission component 1104 may transmit, to the base station, an indication of the UE modulation signature.

The reception component 1102 may receive, from the second wireless node, an indication of a RIS modulation signature detection capability of the second wireless node, and the transmission component 1104 may transmit the first signal modulated using the first modulation signature is based at least in part on the indication of the RIS modulation signature detection capability of the second wireless node.

In some aspects, the reception component 1102 may receive a first signal. The decoding component 1110 may the first signal, wherein the first signal being decodable indicates that the first signal has been redirected by a RIS. The transmission component 1104 may transmit, to a first wireless node and based at least in part on the decoding component 1110 decoding the first signal, a second signal indicating that the first signal has been reflected by the RIS and received by the second wireless node.

The transmission component 1104 may transmit, to the first wireless node, an indication of a RIS modulation signature detection capability.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
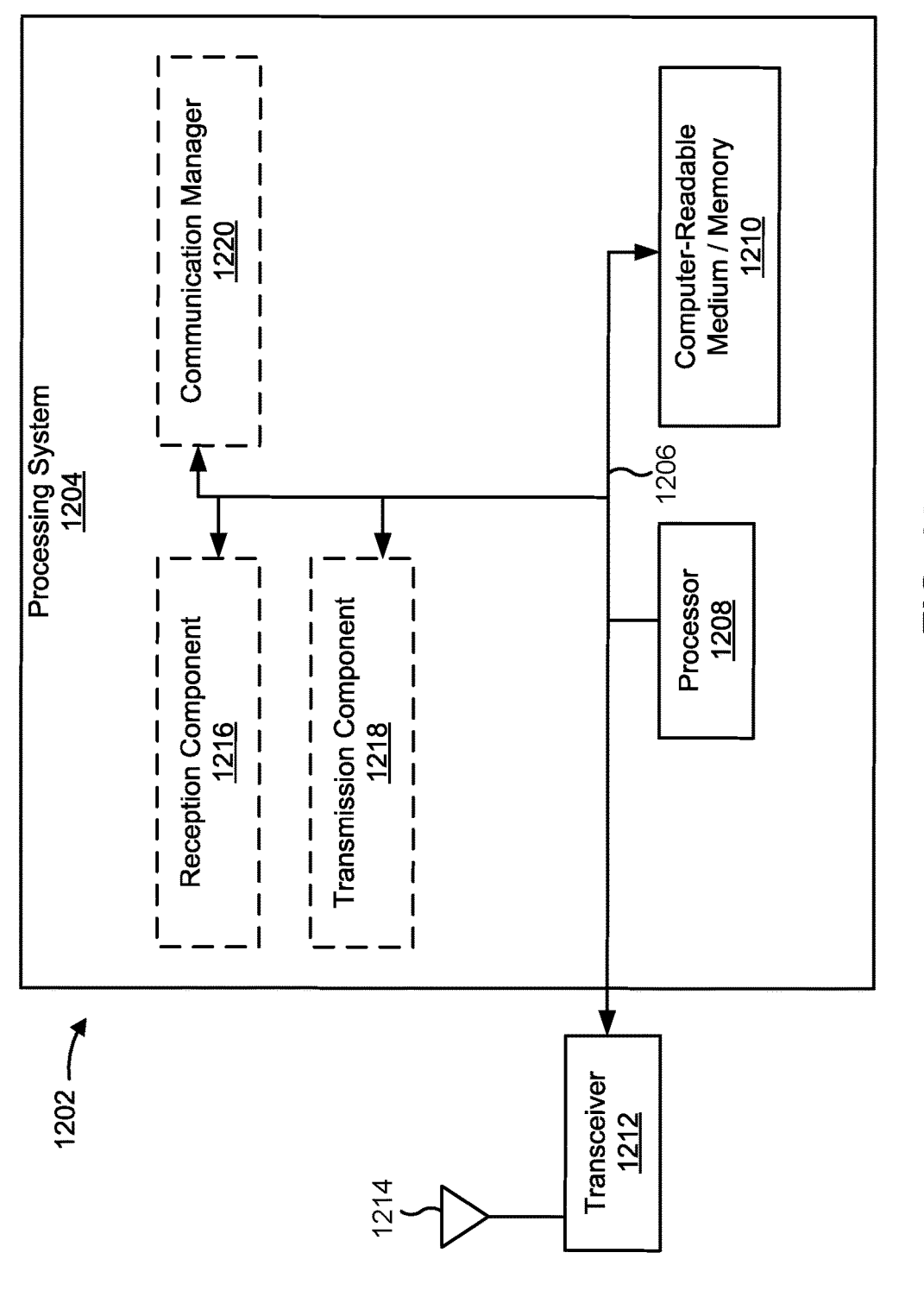
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1202 employing a processing system 1204. The apparatus 1202 may be a wireless node.

The processing system 1204 may be implemented with a bus architecture, represented generally by the bus 1206. The bus 1206 may include any number of interconnecting buses and bridges depending on the specific application of the processing system 1204 and the overall design constraints. The bus 1206 links together various circuits including one or more processors and/or hardware components, represented by the processor 1208, the illustrated components (e.g., the reception component 1216, the transmission component 1218, and the communication manager 1220), and the computer-readable medium/memory 1210. The bus 1206 may also link various other circuits, such as timing sources, peripherals, voltage regulators, and/or power management circuits.

The processing system 1204 may be coupled to a transceiver 1212. The transceiver 1212 is coupled to one or more antennas 1214. The transceiver 1212 provides a means for communicating with various other apparatuses over a transmission medium. The transceiver 1212 receives a signal from the one or more antennas 1214, extracts information from the received signal, and provides the extracted information to the processing system 1204, specifically the reception component 1216. In addition, the transceiver 1212 receives information from the processing system 1204, specifically the transmission component 1218, and generates a signal to be applied to the one or more antennas 1214 based at least in part on the received information.

The processing system 1204 includes a processor 1208 coupled to a computer-readable medium/memory 1210. The processor 1208 is responsible for general processing, including the execution of software stored on the computer-readable medium/memory 1210. The software, when executed by the processor 1208, causes the processing system 1204 to perform the various functions described herein for any particular apparatus. The computer-readable medium/memory 1210 may also be used for storing data that is manipulated by the processor 1208 when executing software. The processing system also may include a communication manager 1220. The communication manager 1220 may organize, prioritize, activate, facilitate and/or otherwise manage communication operations performed by the apparatus 1202. The processing system 1204 may include any number of additional components not illustrated in FIG. 12.

The components illustrated and/or not illustrated may be software modules running in the processor 1208, resident/stored in the computer readable medium/memory 1210, one or more hardware modules coupled to the processor 1208, or some combination thereof.

In some aspects, the processing system 1204 may be a component of the UE 120 and may include the memory 282 and/or at least one of the TX MIMO processor 266, the RX processor 258, and/or the controller/processor 280. In some aspects, the apparatus 1202 for wireless communication includes means for transmitting, to a RIS, a first signal modulated using a first modulation signature, wherein the first modulation signature is an inverted modulation signature associated with a second modulation signature to be applied by the RIS; and/or means for receiving, from a second wireless node, a second signal indicating that the first signal has been redirected by the RIS and received by the second wireless node. In some aspects, the apparatus 1202 for wireless communication includes means for receiving a first signal; means for decoding the first signal, wherein the first signal being decodable indicates that the first signal has been redirected by a RIS; and/or means for transmitting, to a first wireless node and based at least in part on decoding the first signal, a second signal indicating that the first signal has been reflected by the RIS and received by the apparatus 1202. The aforementioned means may be one or more of the aforementioned components of the apparatus 1100 and/or the processing system 1204 of the apparatus 1202 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

In some aspects, the processing system 1204 may be a component of the base station 110 and may include the memory 242 and/or at least one of the TX MIMO processor 230, the RX processor 238, and/or the controller/processor 240. In some aspects, the apparatus 1202 for wireless communication includes means for transmitting, to a RIS, a first signal modulated using a first modulation signature, wherein the first modulation signature is an inverted modulation signature associated with a second modulation signature to be applied by the RIS; and/or means for receiving, from a second wireless node, a second signal indicating that the first signal has been redirected by the RIS and received by the second wireless node. In some aspects, the apparatus 1202 for wireless communication includes means for receiving a first signal; means for decoding the first signal, wherein the first signal being decodable indicates that the first signal has been redirected by a RIS; and/or means for transmitting, to a first wireless node and based at least in part on decoding the first signal, a second signal indicating that the first signal has been reflected by the RIS and received by the apparatus 1202. The aforementioned means may be one or more of the aforementioned components of the apparatus 1100 and/or the processing system 1204 of the apparatus 1202 configured to perform the functions recited by the aforementioned means. As described elsewhere herein, the processing system 1204 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

Figure 13:
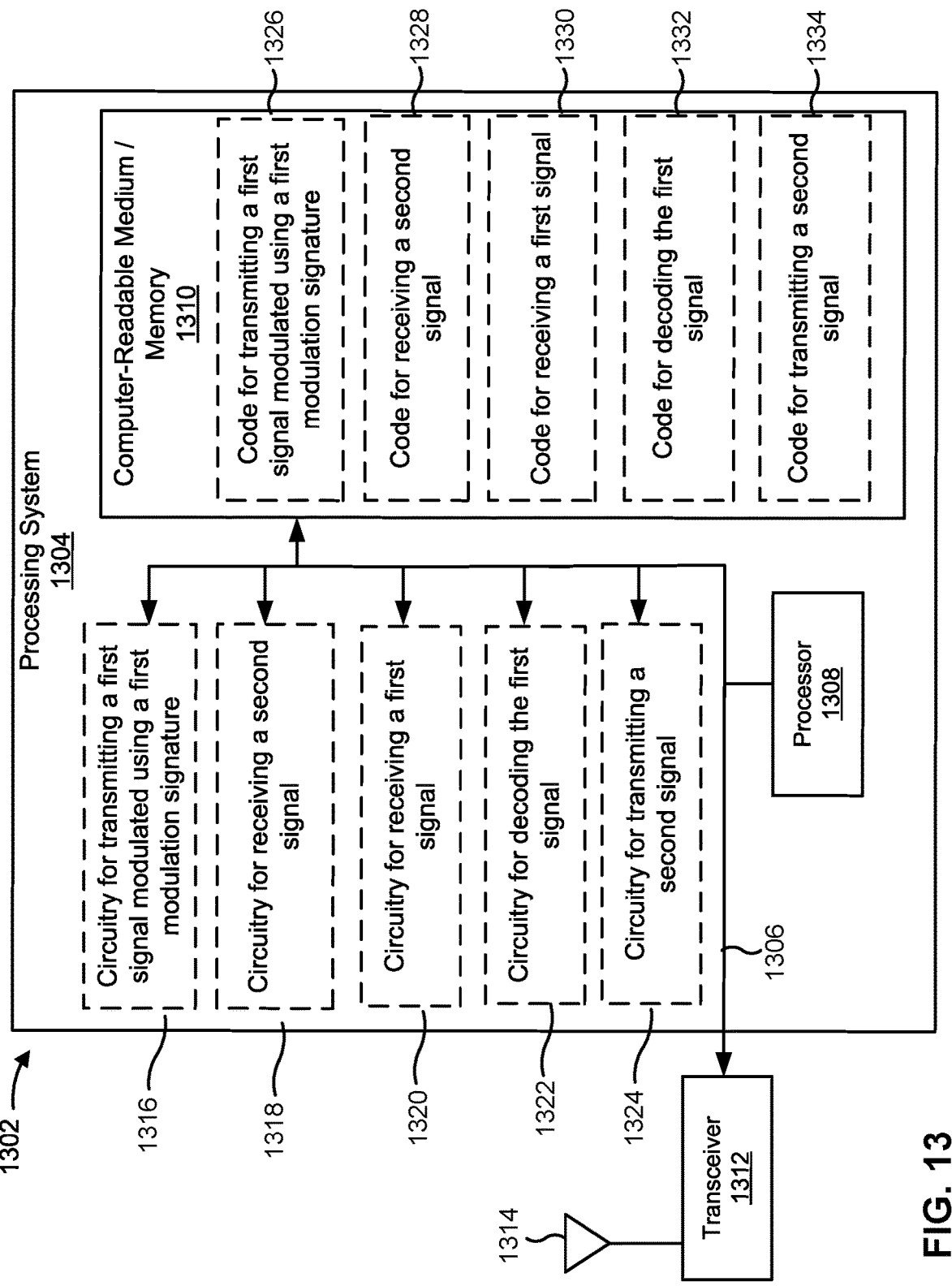
FIG. 13 is a diagram illustrating an example implementation of code and circuitry for an apparatus, in accordance with the present disclosure.

FIG. 13 is a diagram illustrating an example 1300 of an implementation of code and circuitry for an apparatus 1302 for wireless communication. The apparatus 1302 may be, be similar to, include, or be included in the apparatus 1100 shown in FIG. 11, and/or the apparatus 1202 shown in FIG. 12. For example, the apparatus 1302 may be, or include, a base station or a UE. The apparatus 1302 may include a processing system 1304, which may include a bus 1306 coupling one or more components such as, for example, a processor 1308, computer-readable medium/memory 1310, a transceiver 1312, and/or the like. As shown, the transceiver 1312 may be coupled to one or more antenna 1314.

As further shown in FIG. 13, the apparatus 1302 may include circuitry for transmitting, to a RIS, a first signal modulated using a first modulation signature, wherein the first modulation signature is an inverted modulation signature associated with a second modulation signature to be applied by the RIS (circuitry 1316). For example, the apparatus 1302 may include circuitry 1316 to enable the transceiver 1312 to transmit, to a RIS, a first signal modulated using a first modulation signature, wherein the first modulation signature is an inverted modulation signature associated with a second modulation signature to be applied by the RIS.

As further shown in FIG. 13, the apparatus 1302 may include circuitry for receiving a second signal indicating that the first signal has been redirected by the RIS and received by a second wireless node (circuitry 1318). For example, the apparatus 1302 may include circuitry 1318 to enable the transceiver 1312 to receive, from a second wireless node, a second signal indicating that the first signal has been redirected by the RIS and received by the second wireless node.

As further shown in FIG. 13, the apparatus 1302 may include circuitry for receiving a first signal (circuitry 1320). For example, the apparatus 1302 may include circuitry 1320 to enable the transceiver 1312 to receive a first signal.

As further shown in FIG. 13, the apparatus 1302 may include circuitry for decoding the first signal, wherein the first signal being decodable indicates that the first signal has been redirected by a RIS (circuitry 1322). For example, the apparatus 1302 may include circuitry 1322 to enable the transceiver 1312 to decode the first signal, wherein the first signal being decodable indicates that the first signal has been redirected by a RIS.

As further shown in FIG. 13, the apparatus 1302 may include circuitry for transmitting a second signal indicating that the first signal has been reflected by the RIS and received by the apparatus 1302 (circuitry 1324). For example, the apparatus 1302 may include circuitry 1324 to enable the transceiver 1312 to transmit, to a first wireless node, a second signal indicating that the first signal has been reflected by the RIS and received by the apparatus 1302.

As further shown in FIG. 13, the apparatus 1302 may include, stored in computer-readable medium 1310, code for transmitting, to a RIS, a first signal modulated using a first modulation signature, wherein the first modulation signature is an inverted modulation signature associated with a second modulation signature to be applied by the RIS (code 1326). For example, the apparatus 1302 may include code 1326 that, when executed by the processor 1308, may cause the transceiver 1312 to transmit, to a RIS, a first signal modulated using a first modulation signature, wherein the first modulation signature is an inverted modulation signature associated with a second modulation signature to be applied by the RIS.

As further shown in FIG. 13, the apparatus 1302 may include, stored in computer-readable medium 1310, code for receiving a second signal indicating that the first signal has been redirected by the RIS and received by a second wireless node (code 1328). For example, the apparatus 1302 may include code 1328 that, when executed by the processor 1308, may cause the transceiver 1312 to receive, from a second wireless node, a second signal indicating that the first signal has been redirected by the RIS and received by the second wireless node.

As further shown in FIG. 13, the apparatus 1302 may include, stored in computer-readable medium 1310, code for receiving a first signal (code 1330). For example, the apparatus 1302 may include code 1330 that, when executed by the processor 1308, may cause the transceiver 1312 to receive a first signal.

As further shown in FIG. 13, the apparatus 1302 may include, stored in computer-readable medium 1310, code for decoding the first signal, wherein the first signal being decodable indicates that the first signal has been redirected by a RIS (code 1332). For example, the apparatus 1302 may include code 1332 that, when executed by the processor 1308, may cause the transceiver 1312 to decode the first signal, wherein the first signal being decodable indicates that the first signal has been redirected by a.

As further shown in FIG. 13, the apparatus 1302 may include, stored in computer-readable medium 1310, code for transmitting a second signal indicating that the first signal has been reflected by the RIS and received by the apparatus 1302 (code 1334). For example, the apparatus 1302 may include code 1334 that, when executed by the processor 1308, may cause the transceiver 1312 to transmit, to a first wireless node, a return signal indicating that the first signal has been reflected by the RIS and received by the apparatus 1302.

FIG. 13 is provided as an example. Other examples may differ from what is described in connection with FIG. 13.

Figure 14:
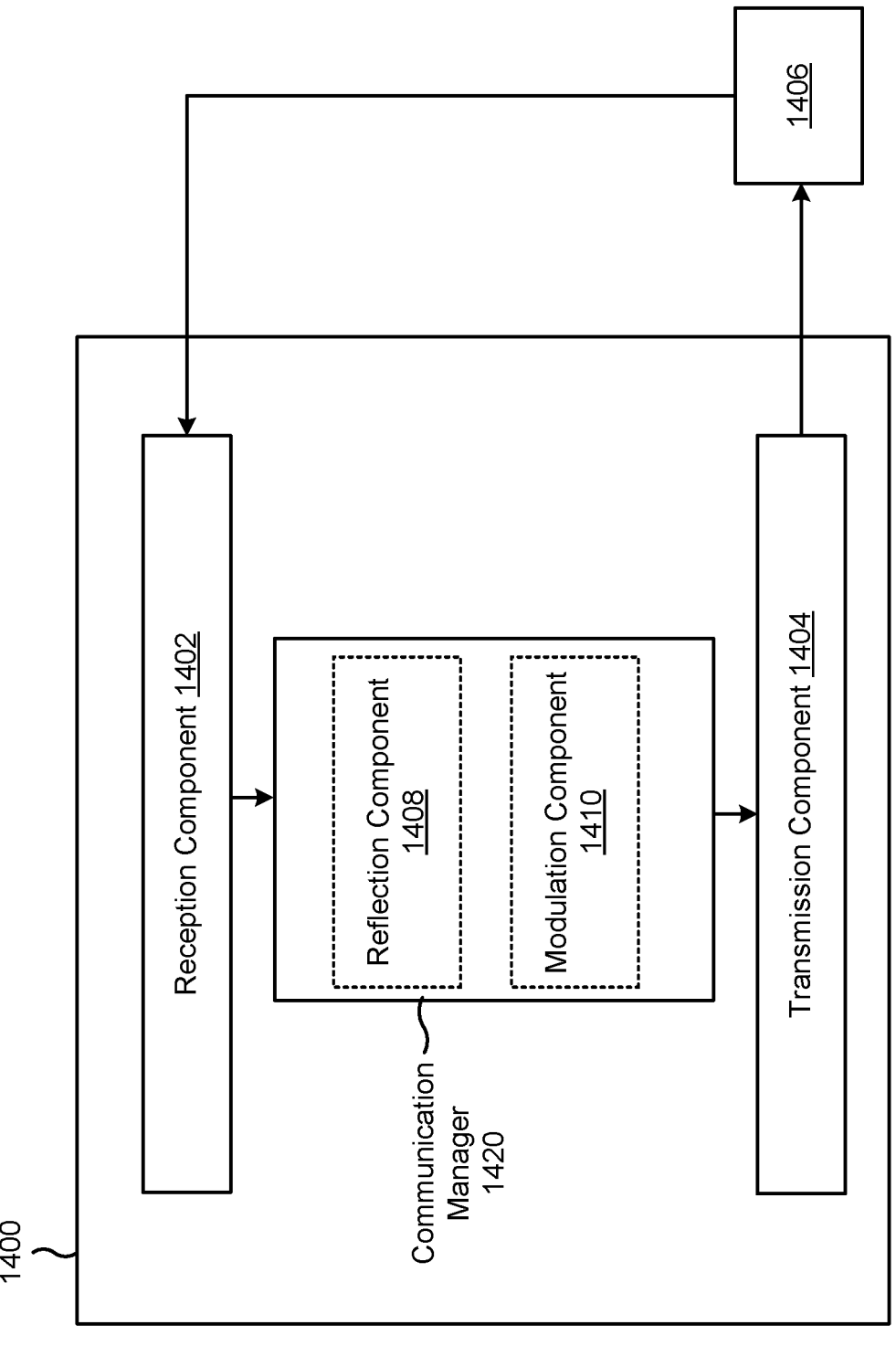
FIG. 14 is a diagram of an example apparatus for wireless communication, in accordance with the present disclosure.

FIG. 14 is a diagram of an example apparatus 1400 for wireless communication. The apparatus 1400 may be a RIS, or a RIS may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1420. The communication manager 1420 may include one or more of a reflection component 1408 and/or a modulation component 1410, among other examples.

In some aspects, the apparatus 1400 may be configured to perform one or more operations described herein in connection with FIGS. 6-7. Additionally, or alternatively, the apparatus 1400 may be configured to perform one or more processes described herein, such as process 1000 of FIG. 10, or a combination thereof. In some aspects, the apparatus 1400 and/or one or more components shown in FIG. 14 may include one or more components of the RIS described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the RIS described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the RIS described in connection with FIG. 2. In some aspects, the transmission component 1404 may be co-located with the reception component 1402 in a transceiver. In some aspects, the RIS may not include a transmission component 1404.

The reception component 1402 may receive, from a first wireless node, a sensing signal modulated by a first modulation signature. The reflection component 1408 and/or the modulation component 1410 may redirect the sensing signal using a second modulation signature that reverses the first modulation signature.

The reception component 1402 may receive an indication of the second modulation signature.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
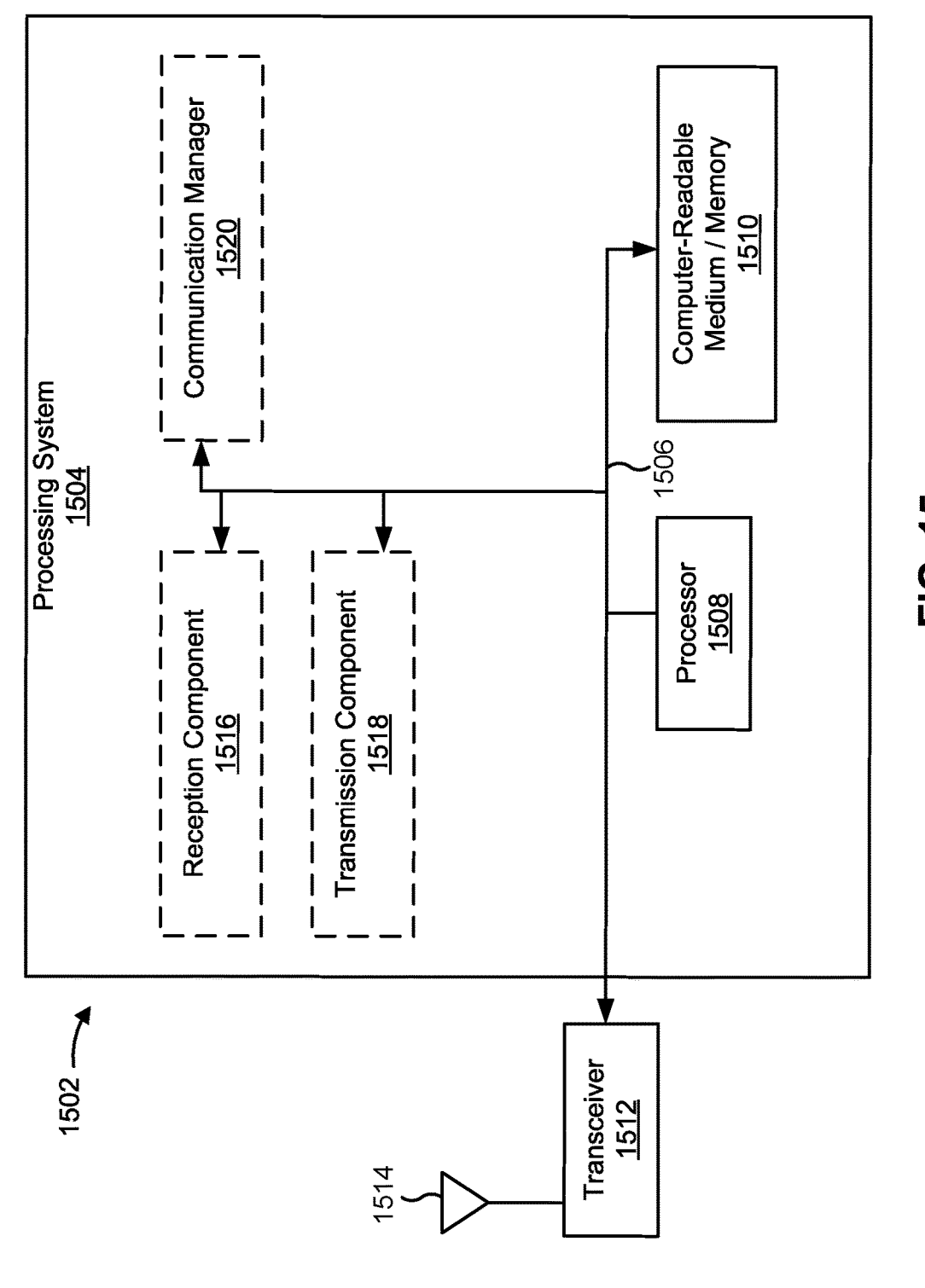
FIG. 15 is a diagram illustrating an example of a hardware implementation for an apparatus employing a processing system, in accordance with the present disclosure.

FIG. 15 is a diagram illustrating an example 1500 of a hardware implementation for an apparatus 1502 employing a processing system 1504. The apparatus 1502 may be a wireless node.

The processing system 1504 may be implemented with a bus architecture, represented generally by the bus 1506. The bus 1506 may include any number of interconnecting buses and bridges depending on the specific application of the processing system 1504 and the overall design constraints. The bus 1506 links together various circuits including one or more processors and/or hardware components, represented by the processor 1508, the illustrated components (e.g., the reception component 1516, the transmission component 1518, and the communication manager 1520), and the computer-readable medium/memory 1510. The bus 1506 may also link various other circuits, such as timing sources, peripherals, voltage regulators, and/or power management circuits.

The processing system 1504 may be coupled to a transceiver 1512. The transceiver 1512 is coupled to one or more antennas 1514. The transceiver 1512 provides a means for communicating with various other apparatuses over a transmission medium. The transceiver 1512 receives a signal from the one or more antennas 1514, extracts information from the received signal, and provides the extracted information to the processing system 1504, specifically the reception component 1516. In addition, the transceiver 1512 receives information from the processing system 1504, specifically the transmission component 1518, and generates a signal to be applied to the one or more antennas 1514 based at least in part on the received information.

The processing system 1504 includes a processor 1508 coupled to a computer-readable medium/memory 1510. The processor 1508 is responsible for general processing, including the execution of software stored on the computer-readable medium/memory 1510. The software, when executed by the processor 1508, causes the processing system 1504 to perform the various functions described herein for any particular apparatus. The computer-readable medium/memory 1510 may also be used for storing data that is manipulated by the processor 1508 when executing software. The processing system also may include a communication manager 1520. The communication manager 1520 may organize, prioritize, activate, facilitate and/or otherwise manage communication operations performed by the apparatus 1502. The processing system 1504 may include any number of additional components not illustrated in FIG. 15. The components illustrated and/or not illustrated may be software modules running in the processor 1508, resident/stored in the computer readable medium/memory 1510, one or more hardware modules coupled to the processor 1508, or some combination thereof.

In some aspects, the processing system 1504 may be a component of a RIS. In some aspects, the apparatus 1502 for wireless communication includes means for receiving, from a first wireless node, a sensing signal modulated by a first modulation signature; and/or means for redirecting the sensing signal using a second modulation signature that reverses the first modulation signature. The aforementioned means may be one or more of the aforementioned components of the apparatus 1400 and/or the processing system 1504 of the apparatus 1502 configured to perform the functions recited by the aforementioned means. In one configuration, the aforementioned means may be one or more of communication manager 1520, a transmit processor, an antenna, a modem, a receive processor, a controller/processor, a memory, and/or one or more reconfigurable elements.

FIG. 15 is provided as an example. Other examples may differ from what is described in connection with FIG. 15.

Figure 16:
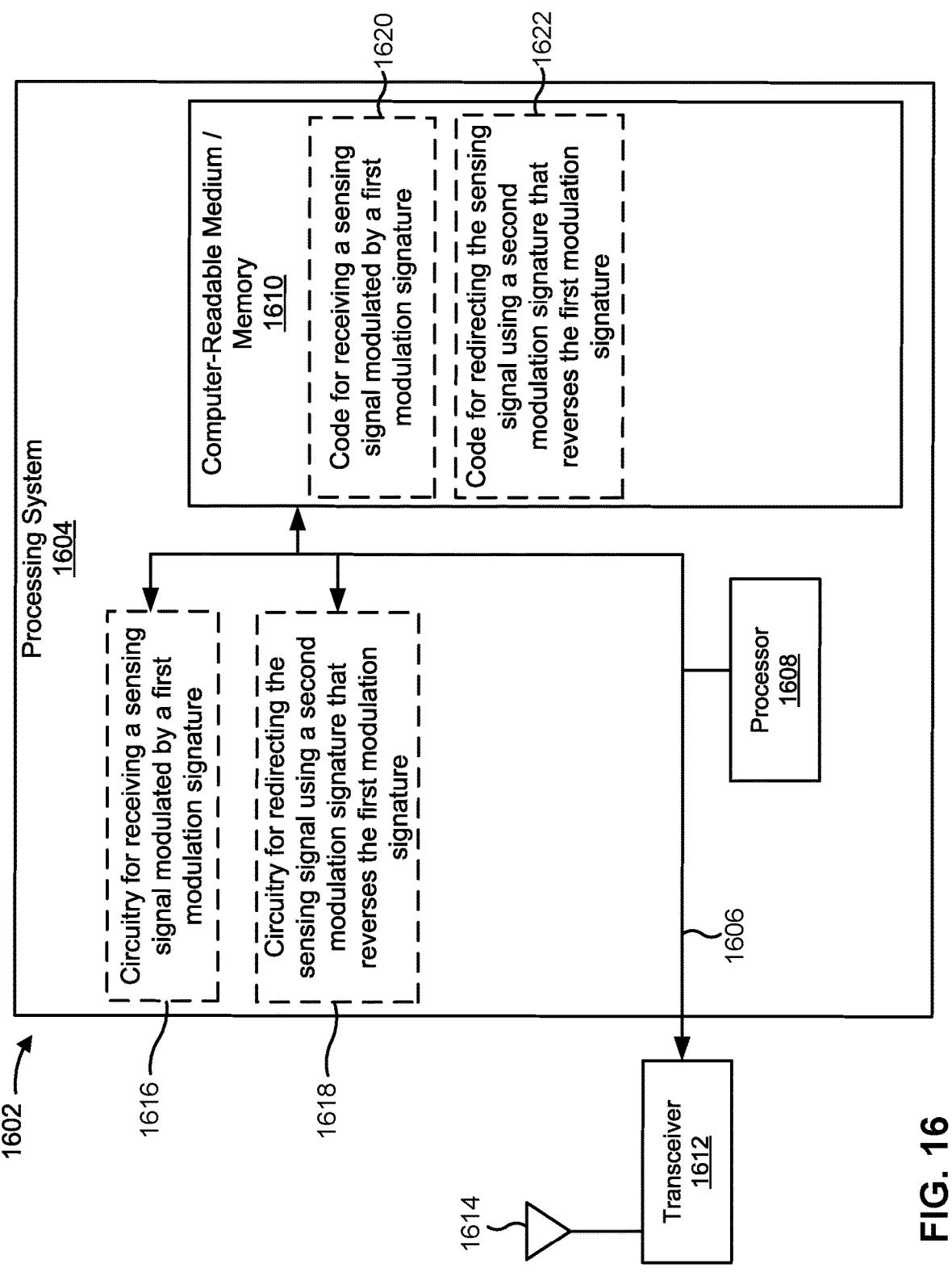
FIG. 16 is a diagram illustrating an example implementation of code and circuitry for an apparatus, in accordance with the present disclosure.

FIG. 16 is a diagram illustrating an example 1600 of an implementation of code and circuitry for an apparatus 1602 for wireless communication. The apparatus 1602 may be, be similar to, include, or be included in the apparatus 1400 shown in FIG. 14, and/or the apparatus 1502 shown in FIG. 15. For example, the apparatus 1602 may be, or include, a RIS. The apparatus 1602 may include a processing system 1604, which may include a bus 1606 coupling one or more components such as, for example, a processor 1608, computer-readable medium/memory 1610, a transceiver 1612, and/or the like. As shown, the transceiver 1612 may be coupled to one or more antenna 1614.

As further shown in FIG. 16, the apparatus 1602 may include circuitry for receiving, from a first wireless node, a sensing signal modulated by a first modulation signature (circuitry 1616). For example, the apparatus 1602 may include circuitry 1616 to enable the apparatus 1602 to receive, from a first wireless node, a sensing signal modulated by a first modulation signature.

As further shown in FIG. 16, the apparatus 1602 may include circuitry for redirecting the sensing signal using a second modulation signature that reverses the first modulation signature (circuitry 1618). For example, the apparatus 1602 may include circuitry 1618 to enable the apparatus 1602 to redirect the sensing signal using a second modulation signature that reverses the first modulation signature.

As further shown in FIG. 16, the apparatus 1602 may include, stored in computer-readable medium 1610, code for receiving, from a first wireless node, a sensing signal modulated by a first modulation signature (code 1620). For example, the apparatus 1602 may include code 1620 that, when executed by the processor 1608, may cause the apparatus 1602 to receive, from a first wireless node, a sensing signal modulated by a first modulation signature.

As further shown in FIG. 16, the apparatus 1602 may include, stored in computer-readable medium 1610, code for redirecting the sensing signal using a second modulation signature that reverses the first modulation signature (code 1622). For example, the apparatus 1602 may include code 1626 that, when executed by the processor 1608, may cause the apparatus 1602 to redirect the sensing signal using a second modulation signature that reverses the first modulation signature.

FIG. 16 is provided as an example. Other examples may differ from what is described in connection with FIG. 16.

The following provides an overview of some Aspects of the present disclosure:

Aspect 1: A method of wireless communication performed by a first wireless node, comprising: transmitting, to a reconfigurable intelligent surface (RIS), a first signal modulated using a first modulation signature, wherein the first modulation signature is an inverted modulation signature associated with a second modulation signature to be applied by the RIS; and receiving, from a second wireless node, a second signal related to the sensing signal indicating that the first signal has been redirected by the RIS and received by the second wireless node.

Aspect 2: The method of Aspect 1, wherein transmitting the first signal modulated using the first modulation signature comprises: modulating the first signal using the first modulation signature such that the first signal is undecodable unless the first signal is modulated using the second modulation signature to reverse the first modulation signature.

Aspect 3: The method of any of Aspects 1-2, wherein the second modulation signature is a RIS modulation signature associated with the RIS and the first modulation signature is an inverted RIS modulation signature that is reversed by the RIS modulation signature associated with the RIS.

Aspect 4: The method of any of Aspects 1-3, wherein the second modulation signature is a beam-specific RIS modulation signature associated with the RIS, and the first modulation signature is an inverted beam-specific RIS modulation signature that is reversed by the beam-specific RIS beam modulation signature.

Aspect 5: The method of any of Aspects 1-4, wherein the first wireless node is a first user equipment (UE) and the second wireless node is a second UE.

Aspect 6: The method of Aspect 5, further comprising: receiving, from a base station, information associated with the RIS.

Aspect 7: The method of Aspect 6, further comprising: transmitting, to the base station, a request for the information associated with the RIS, wherein receiving the information is based at least in part on transmitting the request for the information.

Aspect 8: The method of any of Aspects 6-7, wherein the second modulation signature is a RIS modulation signature associated with the RIS and the first modulation signature is an inverted RIS modulation signature that is reversed by the RIS modulation signature associated with the RIS, and wherein the information includes at least one of an indication of the RIS modulation signature or an indication of the inverted RIS modulation signature.

Aspect 9: The method of any of Aspects 6-8, wherein the second modulation signature is a beam-specific RIS modulation signature associated with the RIS and the first modulation signature is an inverted beam-specific RIS modulation signature that is reversed by the beam-specific RIS modulation signature, and wherein the information includes at least one of an indication of the beam-specific RIS modulation signature or an indication of the inverted beam-specific RIS modulation signature.

Aspect 10: The method of any of Aspects 6-7, wherein the first modulation signature is a UE modulation signature associated with the first UE and the second modulation signature is an inverted UE modulation signature that reverses the UE modulation signature associated with the first UE.

Aspect 11: The method of Aspect 10, further comprising: determining the UE modulation signature based at least in part on a modulation capability of the RIS indicated in the information associated with the RIS; and transmitting, to the base station, an indication of the UE modulation signature.

Aspect 12: The method of any of Aspects 10-11, wherein the RIS redirects the sensing signal on a set of reflection beams, and wherein the RIS redirects the sensing signal using the inverted UE modulation signature on a subset of reflection beams of the set of reflection beams.

Aspect 13: The method of any of Aspects 1-12, further comprising: receiving, from the second wireless node, an indication of a RIS modulation signature detection capability of the second wireless node, wherein transmitting the first signal modulated using the first modulation signature is based at least in part on the indication of the RIS modulation signature detection capability of the second wireless node.

Aspect 14: The method of any of Aspects 1-13, wherein transmitting the sensing signal using the first modulation signature comprises: sweeping the first signal over a plurality of beam directions, wherein the second signal indicates a beam direction associated with the RIS in the plurality of beam directions.

Aspect 15: The method of Aspect 14, wherein the second signal further indicates a RIS state associated with the RIS.

Aspect 16: The method of any of Aspects 1-4 and 13-15, wherein the first wireless node is a base station and the second wireless node is a user equipment (UE).

Aspect 17: A method of wireless communication performed by a second wireless node, comprising: receiving a first signal; decoding the first signal, wherein the first signal being decodable indicates that the first signal has been redirected by a reconfigurable intelligent surface (RIS); and transmitting, to a first wireless node and based at least in part on decoding the first signal, a second signal related to the sensing signal indicating that the first signal has been reflected by the RIS and received by the second wireless node.

Aspect 18: The method of Aspect 17, wherein the first signal is undecodable by the second wireless node unless the first signal is redirected by the RIS.

Aspect 19: The method of any of Aspects 17-18, wherein the second signal indicates a beam direction associated with the RIS.

Aspect 20: The method of Aspect 19, wherein the second signal indicates a RIS state associated with the RIS.

Aspect 21: The method of any of Aspects 17-20, wherein the first wireless node is a first user equipment (UE) and the second wireless node is a second UE.

Aspect 22: The method of any of Aspects 17-21, further comprising: transmitting, to the first wireless node, an indication of a RIS modulation signature detection capability of the second wireless node.

Aspect 23: The method of any of Aspects 17-20 and 22, wherein the first wireless node is a user equipment (UE) and the second wireless node is a base station.

Aspect 24: A method of wireless communication performed by a reconfigurable intelligent surface (RIS), comprising: receiving, from a first wireless node, a sensing signal modulated by a first modulation signature; and redirecting the sensing signal using a second modulation signature that reverses the first modulation signature.

Aspect 25: The method of Aspect 24, wherein the sensing signal is decodable by a second wireless node based at least in part on the sensing signal being redirected using the second modulation signature that reverses the first modulation signature.

Aspect 26: The method of any of Aspects 24-25, further comprising: receiving an indication of the second modulation signature.

Aspect 27: The method of any of Aspects 24-26, wherein the second modulation signature is a RIS modulation signature associated with the RIS and the first modulation signature is an inverted RIS modulation signature that is reversed by the RIS modulation signature associated with the RIS.

Aspect 28: The method of any of Aspects 24-27, wherein the second modulation signature is a beam-specific RIS modulation signature applied to one or more reflection beams associated with the RIS and the first modulation signature is an inverted beam-specific RIS modulation signature that is reversed by the beam-specific RIS modulation signature.

Aspect 29: The method of any of Aspects 24-26, wherein the first modulation signature is a user equipment (UE)

modulation signature associated with the first wireless node and the second modulation signature is an inverted UE modulation signature that reverses the UE modulation signature.

Aspect 30: The method of any of Aspects 24-29, wherein redirecting the sensing comprises: redirecting the sensing signal on one or more first reflection beams using the second modulation signature that reverses the first modulation signature; and redirecting the sensing signal on one or more second reflection beams without using the second modulation signature that reverses the first modulation signature.

Aspect 31: An apparatus for wireless communication at a device, comprising a processor; memory coupled with the processor; and instructions stored in the memory and executable by the processor to cause the apparatus to perform the method of one or more of Aspects 1-16.

Aspect 32: A device for wireless communication, comprising a memory and one or more processors coupled to the memory, the memory and the one or more processors configured to perform the method of one or more of Aspects 1-16.

Aspect 33: An apparatus for wireless communication, comprising at least one means for performing the method of one or more of Aspects 1-16.

Aspect 34: A non-transitory computer-readable medium storing code for wireless communication, the code comprising instructions executable by a processor to perform the method of one or more of Aspects 1-16.

Aspect 35: A non-transitory computer-readable medium storing a set of instructions for wireless communication, the set of instructions comprising one or more instructions that, when executed by one or more processors of a device, cause the device to perform the method of one or more of Aspects 1-16.

Aspect 36: An apparatus for wireless communication at a device, comprising a processor; memory coupled with the processor; and instructions stored in the memory and executable by the processor to cause the apparatus to perform the method of one or more of Aspects 17-23.

Aspect 37: A device for wireless communication, comprising a memory and one or more processors coupled to the memory, the memory and the one or more processors configured to perform the method of one or more of Aspects 17-23.

Aspect 38: An apparatus for wireless communication, comprising at least one means for performing the method of one or more of Aspects 17-23.

Aspect 39: A non-transitory computer-readable medium storing code for wireless communication, the code comprising instructions executable by a processor to perform the method of one or more of Aspects 17-23.

Aspect 40: A non-transitory computer-readable medium storing a set of instructions for wireless communication, the set of instructions comprising one or more instructions that, when executed by one or more processors of a device, cause the device to perform the method of one or more of Aspects 17-23.

Aspect 41: An apparatus for wireless communication at a device, comprising a processor; memory coupled with the processor; and instructions stored in the memory and executable by the processor to cause the apparatus to perform the method of one or more of Aspects 24-30.

Aspect 42: A device for wireless communication, comprising a memory and one or more processors coupled to the memory, the memory and the one or more processors configured to perform the method of one or more of Aspects 24-30.

Aspect 43: An apparatus for wireless communication, comprising at least one means for performing the method of one or more of Aspects 24-30.

Aspect 44: A non-transitory computer-readable medium storing code for wireless communication, the code comprising instructions executable by a processor to perform the method of one or more of Aspects 24-30.

Aspect 45: A non-transitory computer-readable medium storing a set of instructions for wireless communication, the set of instructions comprising one or more instructions that, when executed by one or more processors of a device, cause the device to perform the method of one or more of Aspects 24-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless node for wireless communication, comprising:
one or more memories; and
one or more processors coupled to the one or more memories, the one or more processors configured to cause the first wireless node to:
transmit, to a reconfigurable intelligent surface (RIS), a first signal modulated by a first modulation signature, wherein the first modulation signature is an inverted modulation signature associated with a second modulation signature associated with the RIS; and
receive, from a second wireless node, a second signal that indicates the first signal has been received by the second wireless node.

2. The first wireless node of claim 1, wherein the one or more processors, to transmit the first signal modulated by the first modulation signature, are configured to cause the first wireless node to:
modulate the first signal by the first modulation signature such that the first signal is undecodable unless the first signal is modulated by the second modulation signature to reverse the first modulation signature.

3. The first wireless node of claim 1, wherein the second modulation signature is a RIS modulation signature associated with the RIS and the first modulation signature is an inverted RIS modulation signature that is reversed by the RIS modulation signature associated with the RIS.

4. The first wireless node of claim 1, wherein the second modulation signature is a beam-specific RIS modulation signature applied to one or more reflection beams associated with the RIS, and the first modulation signature is an inverted beam-specific RIS modulation signature that is reversed by the beam-specific RIS modulation signature.

5. The first wireless node of claim 1, wherein the first wireless node is a first user equipment (UE) and the second wireless node is a second UE.

6. The first wireless node of claim 5, wherein the one or more processors are further configured to cause the first wireless node to:
receive, from a network entity, information associated with the RIS.

7. The first wireless node of claim 6, wherein the one or more processors are further configured to cause the first wireless node to:
transmit, to the network entity, a request for the information associated with the RIS.

8. The first wireless node of claim 6, wherein the second modulation signature is a RIS modulation signature associated with the RIS and the first modulation signature is an inverted RIS modulation signature that is reversed by the RIS modulation signature associated with the RIS, and wherein the information includes at least one of an indication of the RIS modulation signature or an indication of the inverted RIS modulation signature.

9. The first wireless node of claim 6, wherein the second modulation signature is a beam-specific RIS modulation signature associated with the RIS and the first modulation signature is an inverted beam-specific RIS modulation signature that is reversed by the beam-specific RIS modulation signature, and wherein the information includes at least one of an indication of the beam-specific RIS modulation signature or an indication of the inverted beam-specific RIS modulation signature.

10. The first wireless node of claim 6, wherein the first modulation signature is a UE modulation signature associated with the first UE and the second modulation signature is an inverted UE modulation signature that reverses the UE modulation signature associated with the first UE.

11. The first wireless node of claim 10, wherein the one or more processors are further configured to cause the first wireless node to:
determine the UE modulation signature based at least in part on a modulation capability of the RIS indicated in the information associated with the RIS; and
transmit, to the network entity, an indication of the UE modulation signature.

12. The first wireless node of claim 1, wherein the one or more processors, to transmit the first signal modulated by the first modulation signature, are configured to cause the first wireless node to:
sweep the first signal over a plurality of beam directions, wherein the second signal indicates a beam direction associated with the RIS in the plurality of beam directions.

13. The first wireless node of claim 12, wherein the second signal further indicates a RIS state associated with the RIS.

14. The first wireless node of claim 1, wherein the first wireless node is a network entity and the second wireless node is a user equipment (UE).

15. A second wireless node for wireless communication, comprising:
one or more memories; and
one or more processors coupled to the one or more memories, the one or more processors configured to cause the second wireless node to:
receive a first signal from a reconfigurable intelligent surface (RIS);
decode the first signal; and
transmit, to a first wireless node and based at least in part on decoding the first signal, a second signal that indicates the first signal has been received by the second wireless node, wherein a timing of the second signal indicates a beam direction associated with the RIS.

16. The second wireless node of claim 15, wherein the first signal is undecodable by the second wireless node unless the first signal is redirected by the RIS.

17. The second wireless node of claim 15, wherein the second signal indicates the beam direction associated with the RIS.

18. The second wireless node of claim 17, wherein the second signal indicates a RIS state associated with the RIS.

19. The second wireless node of claim 15, wherein the first wireless node is a first user equipment (UE) and the second wireless node is a second UE.

20. The second wireless node of claim 15, wherein the first wireless node is a network entity and the second wireless node is a user equipment (UE).

21. A method of wireless communication performed at a first wireless node, comprising:

transmitting, to a reconfigurable intelligent surface (RIS), a first signal modulated using a first modulation signature, wherein the first modulation signature is an inverted modulation signature associated with a second modulation signature associated with the RIS; and receiving, from a second wireless node, a second signal indicating that the first signal has been received by the second wireless node.

22. The method of claim 21, wherein transmitting the first signal modulated using the first modulation signature comprises:

modulating the first signal using the first modulation signature such that the first signal is undecodable unless the first signal is modulated using the second modulation signature to reverse the first modulation signature.

23. The method of claim 21, wherein the second modulation signature is a RIS modulation signature associated with the RIS and the first modulation signature is an inverted RIS modulation signature that is reversed by the RIS modulation signature associated with the RIS.

24. The method of claim 21, wherein the second modulation signature is a beam-specific RIS modulation signature associated with the RIS, and the first modulation signature is an inverted beam-specific RIS modulation signature that is reversed by the beam-specific RIS modulation signature.

25. The method of claim 21, wherein the first wireless node is a first user equipment (UE) and the second wireless node is a second UE, and wherein the first modulation signature is a UE modulation signature associated with the first UE and the second modulation signature is an inverted UE modulation signature that reverses the UE modulation signature associated with the first UE.

26. The method of claim 21, wherein transmitting the first signal modulated using the first modulation signature comprises:

sweeping the first signal over a plurality of beam directions, wherein the second signal indicates a beam direction associated with the RIS in the plurality of beam directions.

27. The method of claim 26, wherein the second signal further indicates a RIS state associated with the RIS.

28. A method of wireless communication performed at a second wireless node, comprising:

receiving a first signal from a reconfigurable intelligent surface (RIS);

decoding the first signal; and transmitting, to a first wireless node and based at least in part on decoding the first signal, a second signal indicating that the first signal was received by the second wireless node, wherein a timing of the second signal indicates a beam direction associated with the RIS.

29. The method of claim 28, wherein the second signal indicates the beam direction associated with the RIS.

30. The method of claim 29, wherein the second signal further indicates a RIS state associated with the RIS.

31. A non-transitory computer-readable medium storing a set of instructions for wireless communication, the set of instructions comprising:

one or more instructions that, when executed by one or more processors of a first wireless node, cause the first wireless node to:

transmit, to a reconfigurable intelligent surface (RIS), a first signal modulated using a first modulation signature, wherein the first modulation signature is an inverted modulation signature associated with a second modulation signature associated with the RIS; and receive, from a second wireless node, a second signal indicating that the first signal has been received by the second wireless node.

32. The non-transitory computer-readable medium of claim 31, wherein the one or more instructions that, when executed by the one or more processors of the first wireless node, cause the first wireless node to transmit the first signal modulated using the first modulation signature comprise one or more instructions that, when executed by the one or more processors of the first wireless node, cause the first wireless node to:

modulate the first signal using the first modulation signature such that the first signal is undecodable unless the first signal is modulated using the second modulation signature to reverse the first modulation signature.

33. The non-transitory computer-readable medium of claim 31, wherein the second modulation signature is a RIS modulation signature associated with the RIS and the first modulation signature is an inverted RIS modulation signature that is reversed by the RIS modulation signature associated with the RIS.

34. The non-transitory computer-readable medium of claim 31, wherein the second modulation signature is a beam-specific RIS modulation signature associated with the RIS, and the first modulation signature is an inverted beam-specific RIS modulation signature that is reversed by the beam-specific RIS modulation signature.

35. The non-transitory computer-readable medium of claim 31, wherein the first wireless node is a first user equipment (UE) and the second wireless node is a second UE, and wherein the first modulation signature is a UE modulation signature associated with the first UE and the second modulation signature is an inverted UE modulation signature that reverses the UE modulation signature associated with the first UE.

36. The non-transitory computer-readable medium of claim 31, wherein the one or more instructions that, when executed by the one or more processors of the first wireless node, cause the first wireless node to transmit the first signal modulated using the first modulation signature comprise one or more instructions that, when executed by the one or more processors of the first wireless node, cause the first wireless node to:

sweep the first signal over a plurality of beam directions, wherein the second signal indicates a beam direction associated with the RIS in the plurality of beam directions.

37. The non-transitory computer-readable medium of claim 31, wherein the second signal further indicates a RIS state associated with the RIS.

38. A non-transitory computer-readable medium storing a set of instructions for wireless communication, the set of instructions comprising:

one or more instructions that, when executed by one or more processors of a second wireless node, cause the second wireless node to:

receive a first signal from a reconfigurable intelligent surface (RIS);

decode the first signal; and transmit, to a first wireless node and based at least in part on decoding the first signal, a second signal indicating that the first signal was received by the second wireless node, wherein a timing of the second signal indicates a beam direction associated with the RIS.

39. The non-transitory computer-readable medium of claim 38, wherein the second signal indicates the beam direction associated with the RIS.

40. The non-transitory computer-readable medium of claim 39, wherein the second signal further indicates a RIS state associated with the RIS.

41. An apparatus for wireless communication at a reconfigurable intelligent surface (RIS), comprising:

one or more memories; and one or more processors coupled to the one or more memories, the one or more processors configured to cause the RIS to:

receive, from a first wireless node, a sensing signal, wherein the sensing signal corresponds to a first modulation signature;

modulate the sensing signal with a second modulation signature that reverses the first modulation signature; and redirect the sensing signal to a second wireless node.

42. The apparatus of claim 41, wherein the one or more processors are further configured to cause the RIS to:

receive an indication of the second modulation signature.

43. The apparatus of claim 41, wherein the second modulation signature is a RIS modulation signature associated with the RIS and the first modulation signature is an inverted RIS modulation signature that is reversed by the RIS modulation signature associated with the RIS.

44. The apparatus of claim 41, wherein the first modulation signature is a user equipment (UE) modulation signature associated with the first wireless node and the second modulation signature is an inverted UE modulation signature that reverses the UE modulation signature.

45. A method of wireless communication performed at a reconfigurable intelligent surface (RIS), comprising:

receiving, from a first wireless node, a sensing signal, wherein the sensing signal corresponds to a first modulation signature;

modulating the sensing signal with a second modulation signature that reverses the first modulation signature; and redirecting the sensing signal to a second wireless node.

46. The method of claim 45, further comprising:

receiving an indication of the second modulation signature.

47. The method of claim 45, wherein the second modulation signature is a RIS modulation signature associated with the RIS and the first modulation signature is an inverted RIS modulation signature that is reversed by the RIS modulation signature associated with the RIS.

48. The method of claim 45, wherein the first modulation signature is a user equipment (UE) modulation signature associated with the first wireless node and the second modulation signature is an inverted UE modulation signature that reverses the UE modulation signature.

49. A non-transitory computer-readable medium storing a set of instructions for wireless communication, the set of instructions comprising:

one or more instructions that, when executed by one or more processors of a reconfigurable intelligent surface (RIS), cause the RIS to:

receive, from a first wireless node, a sensing signal, wherein the sensing signal corresponds to a first modulation signature;

modulate the sensing signal with a second modulation signature that reverses the first modulation signature; and redirect the sensing signal to a second wireless node.

50. The non-transitory computer-readable medium of claim 49, wherein the set of instructions further comprises one or more instructions that, when executed by the one or more processors of the RIS, cause the RIS to:

receive an indication of the second modulation signature.

51. The non-transitory computer-readable medium of claim 49, wherein the second modulation signature is a RIS modulation signature associated with the RIS and the first modulation signature is an inverted RIS modulation signature that is reversed by the RIS modulation signature associated with the RIS.

52. The non-transitory computer-readable medium of claim 49, wherein the first modulation signature is a user equipment (UE) modulation signature associated with the first wireless node and the second modulation signature is an inverted UE modulation signature that reverses the UE modulation signature.

53. The first wireless node of claim 13, wherein a timing of the second signal indicates the RIS state associated with the RIS.

54. The second wireless node of claim 28, wherein the first signal is undecodable by the second wireless node unless the first signal is redirected by the RIS.

55. The second wireless node of claim 38, wherein the first signal is undecodable by the second wireless node unless the first signal is redirected by the RIS.

\* \* \* \* \*